US006909216B2

(12) United States Patent
Kadoya et al.

(10) Patent No.: US 6,909,216 B2
(45) Date of Patent: Jun. 21, 2005

(54) MOTOR GENERATOR

(75) Inventors: Naoyuki Kadoya, Sakai (JP); Yasuhiro Kondo, Hirakata (JP); Satoshi Tamaki, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/487,943

(22) PCT Filed: May 26, 2003

(86) PCT No.: PCT/JP03/06565

§ 371 (c)(1),
(2), (4) Date: Mar. 4, 2004

(87) PCT Pub. No.: WO03/100949

PCT Pub. Date: Dec. 4, 2003

(65) Prior Publication Data

US 2005/0029890 A1 Feb. 10, 2005

(30) Foreign Application Priority Data

May 29, 2002 (JP) ........................... 2002-155327
Nov. 13, 2002 (JP) ........................... 2002-329455

(51) Int. Cl.[7] .............................................. H02K 1/00
(52) U.S. Cl. ..................... 310/180; 310/254; 310/216; 310/198
(58) Field of Search ................................ 310/216, 254, 310/140, 198, 180, 185, 186

(56) References Cited

U.S. PATENT DOCUMENTS

| 4,591,763 | A | * | 5/1986 | Wanasz et al. ............... 315/304 |
| 4,806,812 | A | * | 2/1989 | Masterman .................. 310/182 |
| 5,811,907 | A | * | 9/1998 | Fukuda et al. ............... 310/254 |
| 6,034,460 | A | | 3/2000 | Tajima et al. ............... 310/156 |
| 6,044,737 | A | | 4/2000 | Yao et al. ....................... 83/13 |
| 6,049,153 | A | | 4/2000 | Nishiyama et al. .......... 310/156 |
| 6,104,117 | A | | 8/2000 | Nakamura et al. ........... 310/254 |
| 6,674,207 | B2 | * | 1/2004 | Blasco Remacha .......... 310/184 |

FOREIGN PATENT DOCUMENTS

| JP | 2-123953 | 5/1990 | ........... H02K/21/14 |
| JP | 3-256505 | 11/1991 | ........... B60L/11/06 |

(Continued)

OTHER PUBLICATIONS

English Language Abstract of JP 9–093976.

(Continued)

*Primary Examiner*—Darren Schuberg
*Assistant Examiner*—Nguyen Hanh
(74) *Attorney, Agent, or Firm*—Greenblum & Bernstein, P.L.C.

(57) ABSTRACT

A permanent magnet embedded type concentrated winding motor generator, wherein of the mechanically and electrically independent first and second winding groups (4, 5), the plurality of first teeth (2) wound with the first winding groups (4) are divided into three groups (I, II, III) for example, and the winding directions of the windings of adjacent first teeth (2) within the same group (I, II, III) are opposite. Furthermore, one second tooth (3) wound with a second winding group (5) with a different winding specification from the first winding groups (4) is provided between each of the groups (I, II, III). Accordingly, the relative sizes of the generated voltages in the first winding groups (4) and the second winding groups (5) differ each other, allowing the realization of a compact and low cost construction capable of charging two different electric potentials from a single unit, which also enables a reduction in distortion of the waveform of the counter electromotive force, a reduction in iron loss, and an improvement in the efficiency of the motor, and enables the efficient charging of power sources with two different electric potentials.

31 Claims, 17 Drawing Sheets

FOREIGN PATENT DOCUMENTS

| | | | | |
|---|---|---|---|---|
| JP | 4-101270 | 9/1992 | .......... | H02K/21/22 |
| JP | 6-038415 | 2/1994 | ............ | H02K/1/27 |
| JP | 06-105512 | 4/1994 | .......... | H02K/19/00 |
| JP | 7-274421 | 10/1995 | ............ | H02K/1/27 |
| JP | 8-009510 | 1/1996 | ............ | B60L/11/12 |
| JP | 8-047793 | 2/1996 | ............ | B23K/35/28 |
| JP | 9-093976 | 4/1997 | .......... | H02K/16/00 |
| JP | 10-234144 | 9/1998 | ............ | H02K/1/10 |
| JP | 2000-152538 | 5/2000 | ............ | H02K/1/27 |
| JP | 2000-156958 | 6/2000 | .......... | H02K/21/22 |
| JP | 2000-245085 | 9/2000 | | |
| JP | 2000-324871 | 11/2000 | ............ | H02P/5/41 |
| JP | 2001-204103 | 7/2001 | ............ | B60L/11/06 |
| JP | 2001-245460 | 9/2001 | .......... | H02K/21/14 |
| JP | 2001-309625 | 11/2001 | .......... | H02K/21/14 |
| JP | 2002-044887 | 2/2002 | ............ | H02K/1/27 |
| WO | 00/72427 | 11/2000 | .......... | H02K/29/03 |

OTHER PUBLICATIONS

English Language Abstract of JP 10–234144.
English Language Abstract of JP 2000–156958.
English Language Abstract of JP 6–038415.
English Language Abstract of JP 2000–152538.
English Language Abstract of JP 2002–044887.
English Language Abstract of JP 7–274421.
English Language Abstract of JP 2000–324871.
English Language Abstract of JP 8–009510.
English Language Abstract of JP 2001–204103.
English Language Abstract of JP 2001–245460.
English Language Abstract of JP 3–256505.
English Language Abstract of JP 6–105512.
Toyota, "Estima Hybrid New Vehicle Manual, Type: AHR10W," Jun. 15, 2001, Japan, pp. 0–9 and 1–31, together with an English language translation of the same. applicants also note that this document is mentioned on p. 2 of the specification of the present application.
English Language Abstract of JP 2001–309625.
English Language Abstract of JP2–123953.
English Language Abstract of JP 8–047793.
English Language Abstract of JP 2000–245085.

* cited by examiner

MOTOR GENERATOR

TECHNICAL FIELD

The present invention relates to a motor generator, suitable for an electric vehicle such as a PEV (Pure Electric Vehicle), a HEV (Hybrid Electric Vehicle), or a FCEV (Fuel Cell Electric Vehicle).

BACKGROUND ART

Conventionally, a hybrid electric vehicle that has an engine and an electric motor as the drive section comprises two types of battery, namely a high voltage battery for driving the electric motor, and an auxiliary low voltage battery for lamps and audio systems and the like. The batteries installed in the vehicle are constructed so that, taking maintenance into consideration, the batteries are charged by a motor generator installed in the vehicle.

The construction of a conventional hybrid electric vehicle is shown in FIG. 16. The reference numeral 8 indicates an engine and the reference numeral 9 indicates an electric motor, and power is transmitted from the engine or the electric motor, or from both the engine and the electric motor, to the tires via a power switching mechanism 10. The electric motor 9 is controlled from a high voltage battery 70, via a power conversion device 30. The reference numeral 80 indicates an alternator, in a system configuration in which a low voltage battery 90 is charged by the rotation of the engine. The charging of the high voltage battery employs a setup in which the electric motor 9 operates as a generator, and charges the high voltage battery 70 via the power conversion device 30.

Furthermore, FIG. 17 is a structural diagram showing another conventional hybrid electric vehicle. The point of difference from the construction in FIG. 16 is that instead of being charged using the alternator 80, the low voltage battery 90 is charged from the high voltage battery 70 via a DC—DC converter 100 (see "TOYOTA ESTIMA HYBRID new vehicle manual, product number 61994", Toyota Motor Corporation Service Division, published June 2001, p 0–9, p 1–31).

Moreover, regarding the motor generator, many motor generators with field winding systems have been proposed, including known motor generators which comprise two windings, namely a winding connected to the high voltage battery, and a winding connected to the low voltage battery (see Japanese Patent Laid-Open Publication No. Hei 6-105512, pages 1 and 3, FIG. 1).

In a conventional electric vehicle drive system such as those described above, it is necessary to either provide two types of motor generator, for the main high voltage system and for the auxiliary low voltage system, or to provide one type of motor generator and a separate DC—DC converter. Accordingly, problems arise in that more mounting space is required, and in that the associated costs increase.

If the motor generator is configured with a two winding field winding system, a problem occurs in that when winding the windings that are to provide power for the vehicle, the physical size of the motor generator becomes extremely large, and it cannot be installed in a vehicle. In addition, another problem arises in that because a field winding system is used, it is difficult to control the respective windings at the same time.

Accordingly, an object of the present invention is to provide a compact and low cost electric vehicle drive system using a magnetic field system which integrates two types of motor generator.

DISCLOSURE OF THE INVENTION

In order to achieve this object, a motor generator according to the present invention comprises a rotor which retains a plurality of permanent magnets, and a stator that has a plurality of teeth, wherein at least two winding groups are wound separately around the plurality of teeth in a mechanically and electrically mutually independent configuration. In addition, the plurality of teeth are classified into first teeth and second teeth, the plurality of winding groups are classified into first winding groups and second winding groups, and a plurality of groups comprising a plurality of the first teeth wound with a plurality of the first winding groups are provided in the entire stator. In addition, the first winding groups to which voltage of the same phase is applied are wound around the plurality of first teeth so that the winding direction is opposite in adjacent first teeth within the same group, different phases of voltage are applied to the adjacent plurality of groups, and the second teeth which are wound with the second winding groups are provided between groups.

At this time, by using different winding specifications for the first winding groups and the second winding groups, and using fewer turns for the second winding groups, the generated voltage during regeneration in the second winding groups will be set to a lower value than that obtained during regeneration in the first winding groups. Accordingly, for example, the generated voltage produced at the rated speed from the first winding groups can be used as the voltage for the high voltage battery for high voltage systems, and that from the second winding groups can be used as the voltage for the low voltage battery for low voltage systems. Accordingly, the conventional requirements of having to provide, in addition to the motor generator for the high voltage battery, either a separate motor generator for the low voltage battery, or a separate DC—DC converter for a motor generator that generates only one type of voltage during regeneration, is eliminated.

Furthermore, it is also possible to perform power running in the first winding groups by means of the high voltage battery, to drive the motor generator, and perform regeneration in the second winding groups, to charge the low voltage battery.

Furthermore, in the motor generator of the present invention with two or more winding groups, two or more of the independent power conversion devices comprise an inverter composed of switching elements, a gate drive circuit which drives the switching elements of the inverter, a control section which controls the inverter, a current detection sensor which detects the motor current, a magnetic pole position detection sensor which detects the position of the magnetic poles of the motor, and a power source, and the aforementioned two or more power conversion devices share the control section, the magnetic pole position detection sensor, and the power source.

In another aspect of the present invention, the generated voltage of the low voltage windings is set so that the rated voltage is generated at maximum rotations, and the power conversion device connected to the output terminal of each winding is driven in boost mode.

In yet another aspect of the present invention, the generated voltage of the low voltage windings is set so that the rated voltage is generated at approximately half of maximum rotations, and the power conversion device connected to the output terminal of each winding is driven by switching between field strengthening and field weakening.

In yet another aspect of the present invention, the generated voltage produced at the output terminals of at least one of the winding groups is controlled by a control winding wound around a section which forms a magnetic path from the magnets.

In yet another aspect of the present invention, the generated voltage produced at the output terminal of the second winding group is controlled by making the rotation speed of the motor variable in the first winding groups.

Moreover, the motor generator of the present invention uses a permanent magnet embedded type rotor, equipped with inverse saliency inherent in its construction, and consequently by advancing the current phase of the energizing current, reluctance torque will be generated in addition to magnet torque, resulting in a motor generator with higher torque. In other words, a motor generator with the same output will be reduced in size.

In addition, each and every winding is a concentrated winding, which enables the size of the coil ends to be greatly reduced in comparison with distributed windings, allowing the motor generator to be further reduced in size.

Furthermore, regarding the voltage produced in the first winding groups of the motor generator of the present invention, because the winding configuration for the groups corresponding with each of the U, V and W phases is such that adjacent first teeth have opposing polarities, irregularities in the magnetic field distribution are suppressed, and distortion in the waveform of the counter electromotive force induced in the main winding during driving of the motor generator is reduced. Consequently, iron loss in the stator core and the rotor core are reduced, and furthermore, eddy currents are reduced in the permanent magnets within the rotor core, and consequently the accompanying heat generation is reduced, and demagnetization of the permanent magnet is suppressed, enabling an efficient motor generator to be realized.

In addition, in the motor generator of the present invention, the aforementioned plurality of groups may comprise n (where n is an integer $\geq 2$) first teeth each wound with the first winding group. Furthermore, the motor generator of the present invention may be configured such that the relationships:

$$p = 2 \times s \times (\pm 1 + 3 \times k) \text{ and } p > t$$

(wherein k is an integer $\geq 0$)
are satisfied, where the number of poles of the rotor is p, the total number of the first teeth is t, and the number of sets of windings, wherein one set of the first winding groups with the three phases U, V and W constitutes one set, is s (where p, t and s are all positive integers). By doing so, the windings on adjacent first teeth within each group formed from the first winding groups will have different polarities, enabling a reduction in irregularities in the magnetic field distribution, and a reduction in distortion of the waveform of the voltage produced between terminals of the first winding groups during driving of the motor generator. Accordingly, iron loss will be suppressed, and the efficiency of the motor generator will be improved.

In addition, in the motor generator of the present invention, if based on the above, the number of rotor poles is 10q, the total number of slots formed between adjacent first teeth is 9q, the total number of slots formed between the adjacent second teeth is 3q (where in each case q is a positive integer), the angle of a section of the first teeth that opposes the rotor is θ1 [rad], and the angle of a section of the second teeth that opposes the rotor is θ2 [rad], then by employing a construction that satisfies the relationships:

$$\pi/10q < \theta1 < \pi/5q \text{ and}$$

$$\pi/45q < \theta2 < \pi/10q$$

there is less saturation of the magnetic flux and it flows more easily, torque improves further, and on the other hand, waveform distortion in the counter electromotive force induced in the windings is reduced, iron loss is reduced, and heat generation caused by eddy currents in the permanent magnet is also reduced, suppressing demagnetization of the permanent magnet, and thereby improving the efficiency of the motor generator.

In yet another aspect of the motor generator of the present invention, a construction is used in which notches which are angled away from the surface of the rotor that opposes the stator, are provided near the circumferential ends of the tips of the plurality of first teeth, opposing the surface of the rotor that opposes the stator. By using such a construction, it is possible to alleviate sudden changes in the magnetic field in each of the teeth, and to bring the waveform of the counter electromotive force produced in the windings when the motor generator is running closer to a sinusoidal wave, thereby reducing torque ripple and cogging torque.

In yet another aspect of the motor generator of the present invention, a construction is used in which, for each group composed of the first teeth wound with the first winding groups, one or more concave sections are provided at the tips of one or more of the first teeth with in the group. Furthermore, the shape of the concave sections is substantially rectangular or circular arc shaped. Of course, other shapes may also be used.

According to this configuration, the magnetic poles at the tips of the first teeth appear to be subdivided into S, N, S and so on, thus allowing high torque to be obtained, and allowing torque ripple to be minimized.

In the same manner, a configuration may also be used in which one or more concave sections are provided at the tips of the second teeth wound with the second winding groups. Furthermore, by increasing the number of first teeth by employing a construction in which the plurality of second teeth are provided between the groups formed of the plurality of first teeth wound with the first winding groups, at an interval which matches the pole pitch of the rotor, or a construction in which the plurality of second teeth wound with the second winding groups are arranged at equal intervals between the groups composed of the plurality of first teeth wound with the first winding groups, the magnetic flux is utilized effectively, and it is possible to obtain increased torque and increased output.

In yet another aspect of the motor generator of the present invention, the rotor comprises the plurality of permanent magnets, and a rotor core, in which a plurality of slits of substantially the same shape as the permanent magnets but of a width that is narrower than that of the permanent magnets are provided on the opposite side to the stator side of the plurality of permanent magnets.

By employing this construction, the magnetic flux produced by the permanent magnets cannot easily pass the slits, in other words magnetic resistance is heightened, creating a greater difference between sections with high and low magnetic resistance, and producing greater reluctance torque, thereby increasing generated torque.

In yet another aspect of the motor generator of the present invention, a construction will be employed in which a space between the stator side surfaces of the plurality of permanent magnets provided in the rotor and the surface of the rotor that opposes the stator is shaped so as to be larger in the center than at the ends of each of the plurality of permanent magnets, and the plurality of permanent magnets which constitute the rotor are each formed as an approximate V shape protruding away from the surface of the rotor that opposes the stator, a straight line shape that is perpendicular to the radial direction of the rotor, a circular arc shape which protrudes in the direction opposite to the surface of the rotor that opposes the stator, or a circular arc shape which has a larger radius than the radius of the rotor and protrudes in the opposite direction to the surface of the rotor that opposes the stator.

By employing this construction, and thereby providing in the section of the rotor that opposes the stator, sections which readily pass magnetic flux and sections through which magnetic flux does not pass easily, that is sections with comparatively low magnetic resistance and sections with relatively high magnetic resistance, reluctance torque will be generated, and the generated torque will be increased.

Furthermore, by constructing an electric vehicle using a motor generator of the present invention, the requirement seen in conventional electric vehicles of needing to provide two types of motor generator for the high voltage and low voltage systems, or needing to provide a separate DC—DC converter in a motor generator that generates only one kind of voltage during regeneration, is eliminated, and consequently a compact and low cost electric vehicle driving system is constructed, and accordingly, a low cost electric vehicle that allows better utilization of the interior space of the vehicle is provided.

BEST MODE FOR CARRYING OUT THE INVENTION

As follows is a description of the embodiments of the present invention with reference to the drawings.

First Embodiment

Figure 1:
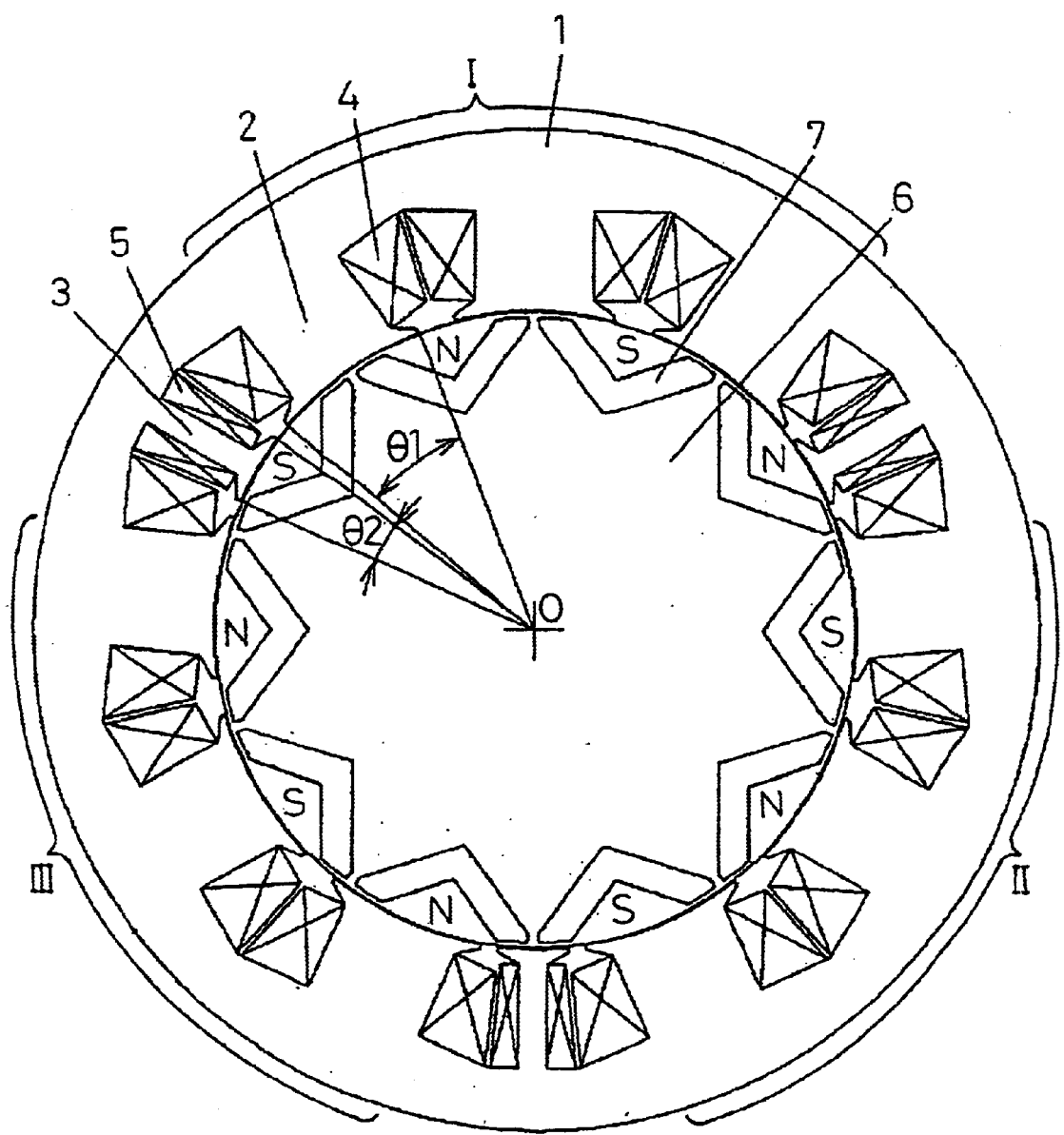
FIG. 1 is a schematic cross-sectional view describing the main elements of a motor generator according to a first embodiment of the present invention.
Figure 2:
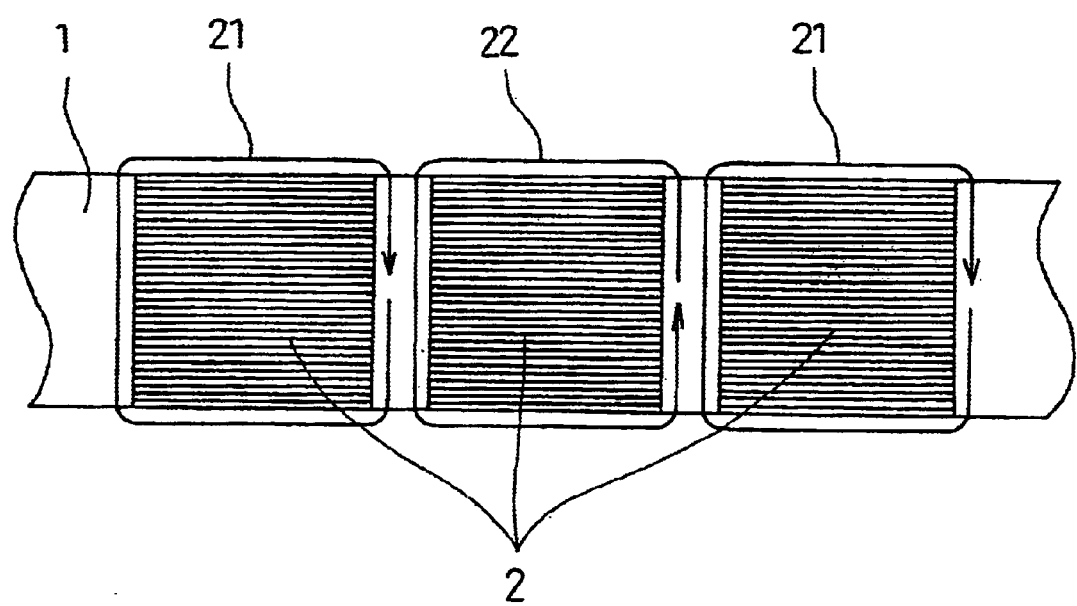
FIG. 2 is a schematic development view describing the winding direction of the windings in the same embodiment.
Figure 3:
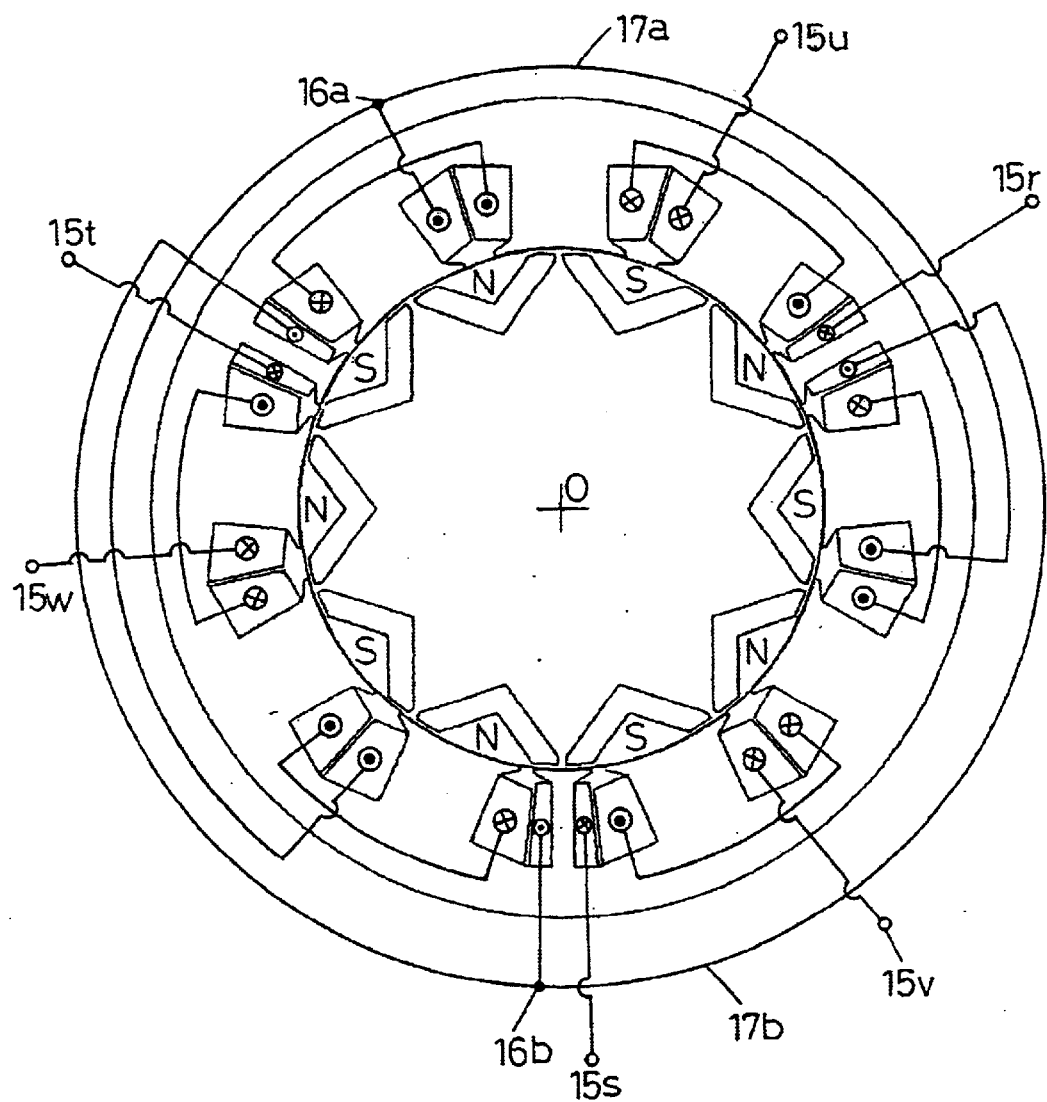
FIG. 3 is a connection diagram showing the connection state between winding groups in the same embodiment.

FIG. 1 through FIG. 3 are figures describing a motor generator according to a first embodiment of the present invention, wherein FIG. 1 is a cross-sectional view showing the main elements of a motor along a cross section perpendicular to the central rotational axis, FIG. 2 is a development view describing the winding direction of the windings on the teeth of the first winding groups, and FIG. 3 is a connection diagram showing the state of the connections between the first and second winding groups.

In FIG. 1, a stator core 1, formed from laminated electromagnetic steel plate, is equipped with teeth 2 around which first winding groups 4 are wound, and teeth 3 around which second winding groups 5 are wound. On the other hand, permanent magnets 7 are embedded in a rotor core 6 formed from laminated electromagnetic steel plate, thereby forming a rotor, and are arranged about the center of rotation O in a freely rotatable manner, leaving a slight gap between the permanent magnets 7 and the first teeth 2 and the second teeth 3. At this time, the permanent magnets 7 are arranged such that the magnetic fields of adjacent permanent magnets 7 have different orientations.

Furthermore, there are a total of nine first teeth 2 around which first windings 4 are wound, which are divided into three groups, namely group I to which U phase voltage is applied, group II to which V phase voltage is applied, and group III to which W phase voltage is applied, with each of group I, II, and III, having three first teeth 2. Furthermore, between each of the groups I, II, and III are provided the second teeth 3 around which are wound the second windings 5. FIG. 2 shows the winding direction of the first windings 4 in each of these groups. The winding directions are arranged so that the winding direction 22 of the first winding 4 that is wound around the first tooth 2 in the center of the group is opposite to the winding direction 21 of the first windings 4 wound around the first teeth 2 positioned at each end of the group. In other words, the winding direction of a first winding 4 wound around a first tooth 2 in groups I, II, and III is the opposite direction to the adjacent first teeth 2 within the same group, so that the polarity of the first windings of adjacent first teeth 2 reverses in an alternating manner. The first winding groups 4 for the first teeth 2 are connected in series, but may also be connected in parallel. In the same manner, the first winding groups 4 are wound around the first teeth 2 in the other groups using the same method, thereby forming a three-phase winding consisting of the U phase, V phase, and W phase for each group, which are arranged with a phase difference of 120 degrees in terms of the electrical angle, thereby forming a star connection. Consequently, in groups I, II, and III, corresponding to the U phase, V phase and W phase respectively, because adjacent first teeth 2 have different polarities, irregularities in the magnetic field distribution is lessened, and distortion in the waveform of the counter-electromotive force, which occurs between terminals when the motor is being driven, is reduced, thus enabling a reduction in the level of iron loss.

In the first embodiment, the groups I, II, and III each comprise three first teeth 2 each wound with a first winding group 4 (that is, the first teeth 2 adopt a three tooth configuration), and one set of U phase, V phase and W phase windings is considered to be one winding set.

According to the above construction, if the number of first teeth 2 (number of teeth) in one group is deemed n (where n is an integer $\geq 2$), the number of sets of windings is deemed s (where s is an integer $\geq 1$), the total number of first teeth 2 is deemed t, and the number of poles of the rotor is deemed p, then the relationship below applies.

$$p=2 \times s(\pm 1+3 \times k) \text{ where } p>t \qquad (1)$$

Using equation (1) above, the number of rotor poles p according to the first embodiment is:

$$p=2\times 1(-1+3\times k)$$

and assuming k=2, $$p=2\times 1(-1+3\times 2)=10$$

The relationship at this time between the number of rotor poles p and the total number t of first teeth 2, which are wound with the first winding groups 4, is:

$$p(=10)>t(=9)$$

and consequently, the construction of the motor generator according to the first embodiment satisfies the equation (1) above.

Here, the angle occupied by each first tooth 2 wound with a first winding group 4 is 36°, equivalent to the angle of a single magnetic pole in a 10-pole rotor. Accordingly, because there are three first teeth 2 in each group, one group occupies 108°, leaving a gap of 12° between the groups.

Here, a construction is used in which second teeth 3 wound with a second winding group 5 are provided in these gaps, although this causes no particular decline in the basic characteristics of the motor formed from the first winding groups 4.

The second winding groups 5 are arranged between the different phases of the first winding groups 4, with a phase difference between phases of 120° in terms of the electrical angle, forming a star connection, and three phase windings that are independent of the first winding groups 4. However, the winding specification is different from that of the first winding groups 4, so that the number of turns is fewer than in the first winding groups 4. For example, the number of turns in the first winding groups 4 is set to 288, while the number of turns in the second winding groups 5 is set to 12, and in terms of their respective outputs, the output is between 10 and 30 kW for the first winding groups 4 and between 1 and 3 kW for the second winding groups 5.

Figure 15:
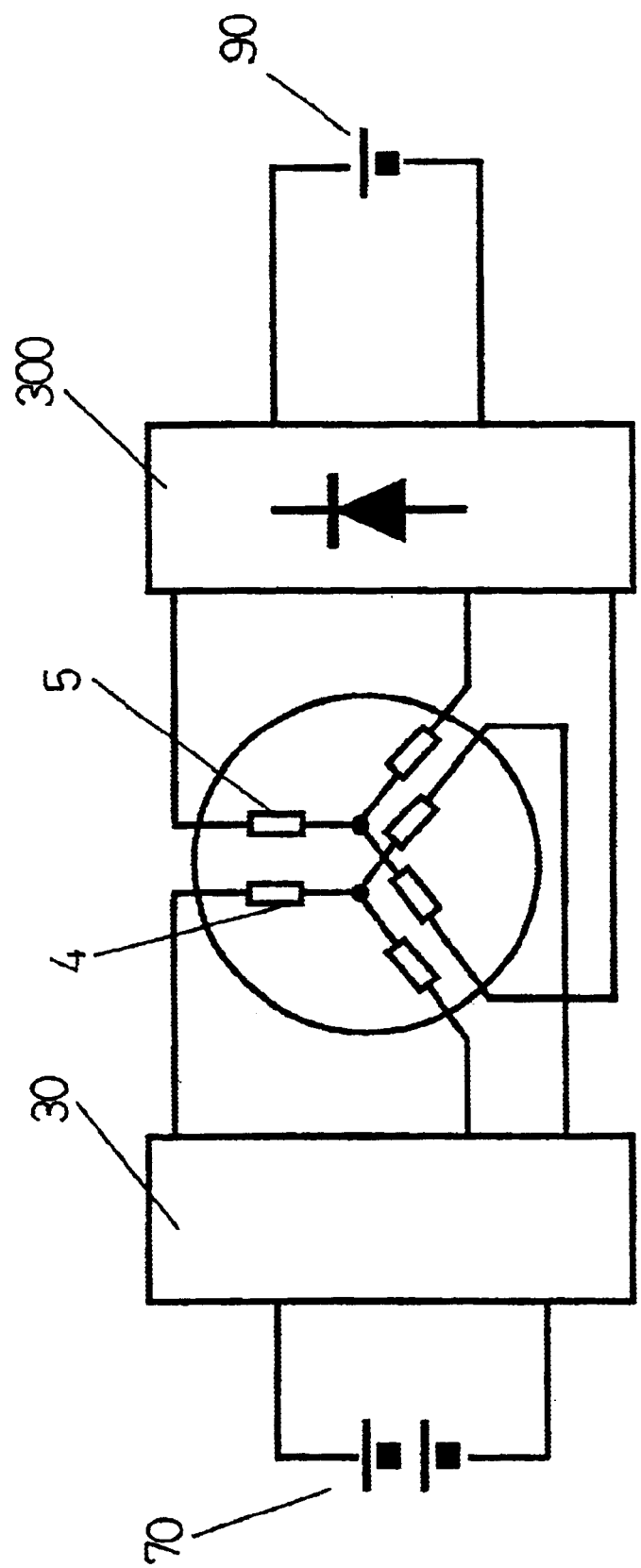
FIG. 15 is a block diagram showing the connection status of the winding groups according to a tenth embodiment of the present invention.
Figure 16:
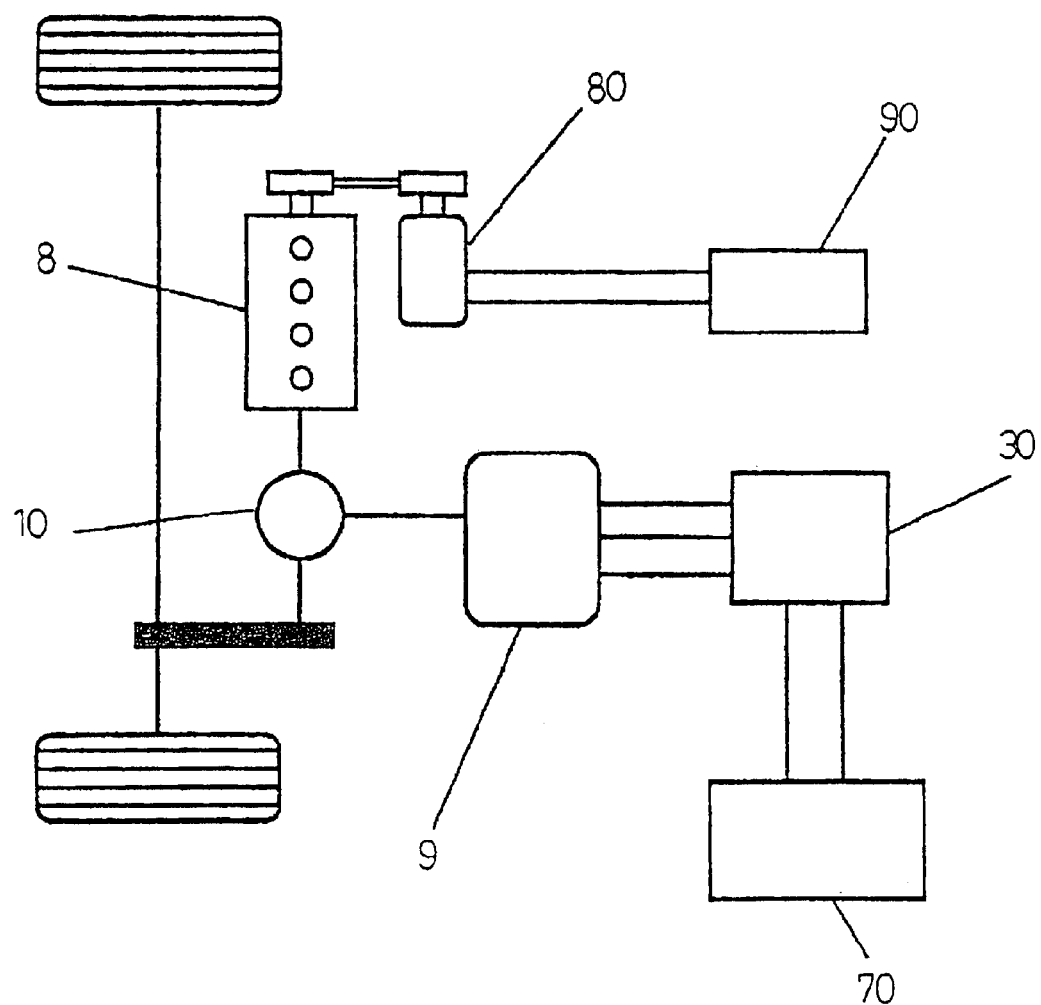
FIG. 16 is a schematic illustration showing the construction of a conventional hybrid vehicle equipped with a motor generator.

Moreover, the connection state of the first winding groups 4 and the second winding groups 5 in the first embodiment is shown in FIG. 3. In FIGS. 3, 15$u$, 15$v$, and 15$w$ are the output points of the U, V, and W phases of the first winding groups 4, respectively, and 15$r$, 15$s$, and 15$t$ are the output points of the U, V and W phases of the second winding groups 5, respectively. The first winding groups 4 are interconnected by wiring 17$a$, and the second winding groups 5 are interconnected by wiring 17$b$, thereby producing a configuration in which the first winding groups 4 and the second winding groups 5 are both mechanically and electrically independent. The reference numerals 16$a$ and 16$b$ in the figure indicate the neutral points.

By employing such a construction, it is possible to perform power running in the first winding groups 4 using the high voltage battery (by applying a voltage), thereby driving the motor generator, and to perform regeneration in the second winding groups 5 (by producing a voltage), thereby charging the low voltage battery.

Here, the second winding groups 5 are set so as to have fewer second teeth 3 wound with windings than the first winding groups 4, but because the output is lower than the first winding groups 4, adequate generation characteristics is ensured.

Furthermore, when both the first winding groups 4 and the second winding groups 5 are used for regeneration, even when the generated voltage during regeneration is high in the first winding groups 4, low voltage is obtained from the second winding groups 5. For example, the generated voltage produced at the rated speed in the first winding groups 4 may be used as the voltage for the high voltage battery for the high voltage systems, and the voltage produced in the second winding groups 5 may be used as the voltage for the low voltage battery for the low voltage systems. Accordingly, the requirement in conventional systems to either provide a separate motor generator for the low voltage battery, or provide a DC—DC converter in addition to the motor generator, is eliminated.

Furthermore, by setting the width of the second teeth 3, which are wound with the second winding groups 5, to an appropriate width, when the magnetic flux within the second teeth 3 reaches a certain level, the amount of magnetic flux is suppressed due to magnetic saturation, thereby keeping the generated voltage produced by the second winding groups 5 low even during high-speed rotation.

In addition, even at higher rotational speeds, by applying field weakening control to the first winding groups 4, it is possible to both suppress the voltage of the first winding groups 4 to the level of the allowable voltage of the high voltage battery of the high voltage systems, and suppress the voltage of the second winding groups 5 to the level of the allowable voltage of the low voltage battery.

Moreover, in the first embodiment, an example was described in which the number of rotor poles (p) was 10, the total number (t) of first teeth 2 around which are wound first winding groups 4 was 9 (that is, 9 slots), and the total number of second teeth 3 around which are wound second winding groups 5 was 3, but the present invention is not limited to such a case, and the combination of the total number of first teeth (t) and the number of rotor poles (p) may adopt any combination from table 1 below.

In addition, the number of second teeth 3 wound with second winding groups 5 provided in each gap between the groups I, II, and III, which are composed of first teeth 2 wound with first winding groups 4, is not limited to one as described in the configuration of the first embodiment, and combinations resulting in configurations where a plurality of second teeth 3 are provided are also possible. In such cases, it is possible to align the pitch between first teeth 2 to the magnetic pitch, and also align the pitch between second teeth 3 to the magnetic pitch, but with such a configuration, the gap between adjacent first teeth 2 and second teeth 3 may not necessarily be the same pitch as the magnetic pitch. Alternatively, it is also possible to divide into equal intervals the gaps between adjacent first teeth 2, the gaps between adjacent second teeth, and the gaps between adjacent first and second teeth 2, 3.

The combination of the total number (t) of first teeth 2 wound with first winding groups 4, the total number of second teeth 3 wound with second winding groups 5, and the number of magnetic poles (p), should be designed appropriately in accordance with the desired balance between the power in the first winding groups 4 and the power in the second winding groups. Table 1 shows examples of potential combinations.

TABLE 1

| | Number of teeth (n) | Number of winding sets (s) | Number of groups | Number of slots | Number of poles (p) |
|---|---|---|---|---|---|
| No. 1 | 2 | 1 | 3 | 6 | 8 |
| No. 2 | 2 | 2 | 6 | 12 | 16 |
| No. 3 | 2 | 3 | 9 | 18 | 24 |
| No. 4 | 2 | 4 | 12 | 24 | 32 |
| No. 5 | 3 | 1 | 3 | 9 | 10 |
| No. 6 | 3 | 2 | 6 | 18 | 20 |
| No. 7 | 3 | 3 | 9 | 27 | 30 |
| No. 8 | 3 | 4 | 12 | 36 | 40 |
| No. 9 | 4 | 1 | 3 | 12 | 14 |
| No. 10 | 4 | 1 | 3 | 12 | 16 |
| No. 11 | 4 | 2 | 6 | 24 | 28 |
| No. 12 | 4 | 2 | 6 | 24 | 32 |
| No. 13 | 5 | 1 | 3 | 15 | 16 |
| No. 14 | 5 | 1 | 3 | 15 | 20 |
| No. 15 | 5 | 1 | 3 | 15 | 22 |
| No. 16 | 5 | 2 | 6 | 30 | 32 |
| No. 17 | 5 | 2 | 6 | 30 | 40 |
| No. 18 | 6 | 1 | 3 | 18 | 20 |
| No. 19 | 6 | 1 | 3 | 18 | 22 |
| No. 20 | 6 | 1 | 3 | 18 | 26 |
| No. 21 | 6 | 2 | 6 | 36 | 40 |
| No. 22 | 7 | 1 | 3 | 21 | 22 |
| No. 23 | 7 | 1 | 3 | 21 | 26 |
| No. 24 | 7 | 1 | 3 | 21 | 28 |

Figure 4:
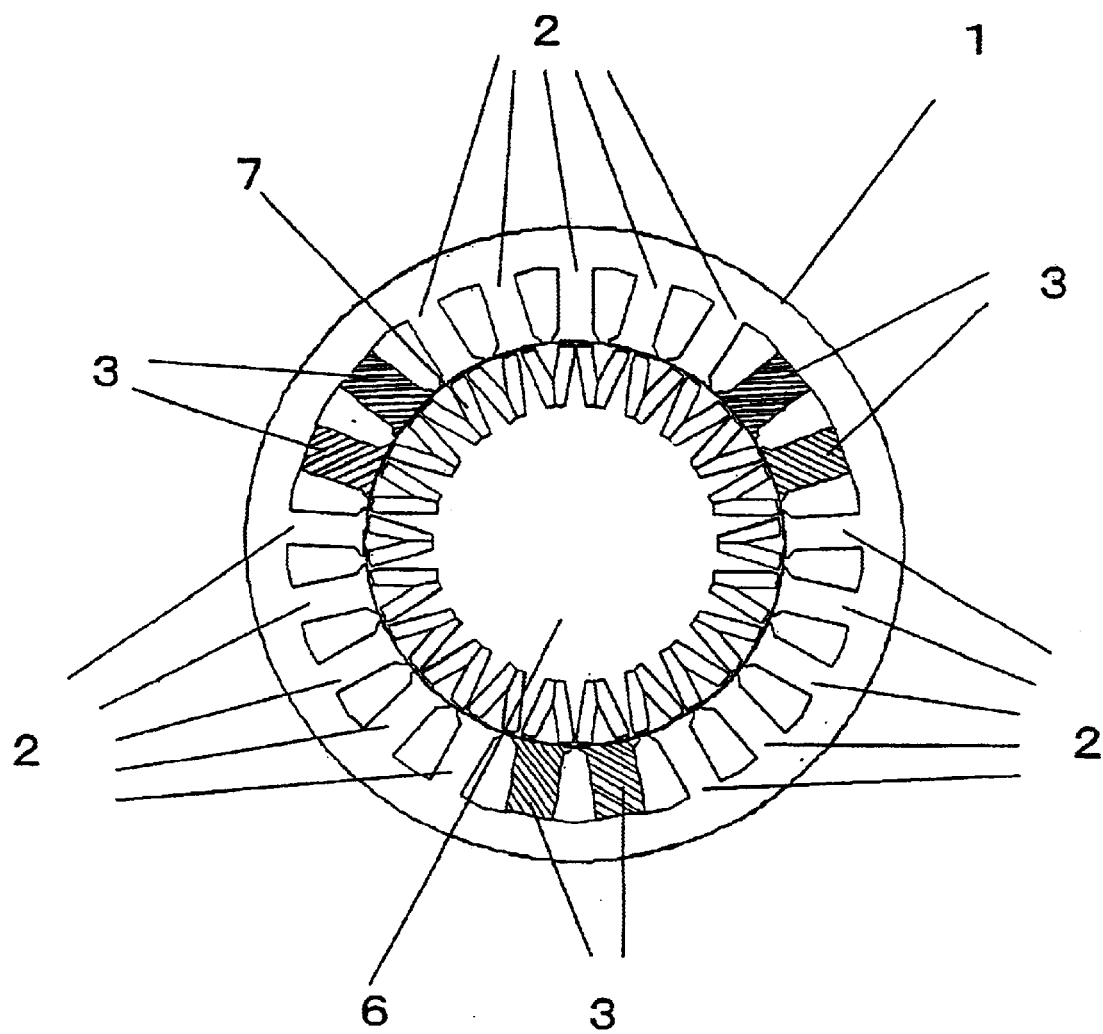
FIG. 4 is a schematic cross-sectional view of the main elements of the motor generator, showing an example of a combination of teeth numbers.

FIG. 4 is a schematic cross-sectional view of the main elements of a motor generator having a configuration in which two second teeth 3 are provided between each of groups I, II, and III, which each comprise five first teeth 2, and all of the first and second teeth 2 and 3 are divided at intervals resulting in an equal pitch. Moreover, in FIG. 4, the first and second winding groups are omitted, but in the same manner as in the motor generator of the configuration described above, in this configuration the winding groups are divided into a group to which U phase voltage is applied, a group to which V phase voltage is applied, and a group to which W phase voltage is applied, and the first winding groups and the second winding groups are mechanically and electrically independent. The configuration illustrated is of the combination No. 15 from table 1 above, and it is apparent that as a result of increasing the number of magnetic poles (p), the gap between each group is increased, and more space may be used for providing the second teeth 3.

In the first embodiment, the number of rotor poles is 10, the total number of slots formed between adjacent first teeth 2 which are wound with the first winding groups 4 (in other words, the total number of first teeth) is 9, and the total number of slots formed between adjacent second teeth 3 which are wound with the second winding groups 5 (in other words, the total number of second teeth) is 3.

As a result of further examination of this configuration, it was found that if the number of rotor poles is 10q, the total number of slots formed between adjacent first teeth 2 is 9q, the total number of slots formed between adjacent second teeth 3 is 3q (where in each case q is a positive integer), the angle of the section of the first teeth 2 that opposes the rotor is θ1 [rad], and the angle of the section of the second teeth 3 that opposes the rotor is θ2 [rad], then by using settings that satisfy the relationships:

$$\pi/10q < \theta 1 < \pi/5q$$

$$\pi/45q < \theta 2 < \pi/10q \quad (2)$$

there is less saturation of the magnetic flux and it flows more easily, torque improves further, and in addition, waveform distortion in the counter electromotive force induced in the windings is reduced, iron loss is reduced, and heat generation caused by eddy currents in the permanent magnet is also reduced, suppressing demagnetization of the permanent magnet, and thereby improving the efficiency of the motor generator.

Second Embodiment

Figure 5:
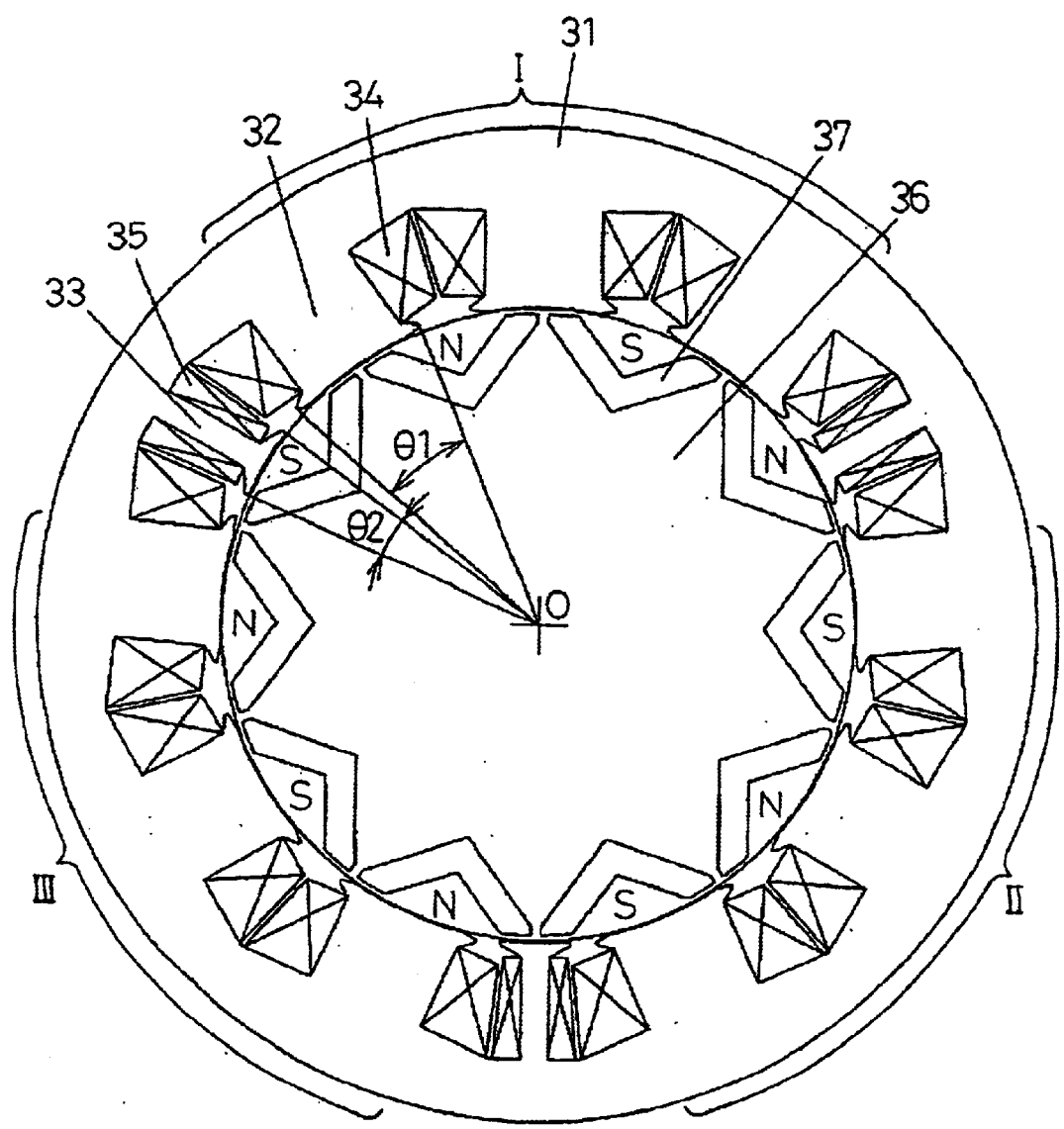
FIG. 5 is a schematic cross-sectional view describing the main elements of a motor generator according to a second embodiment of the present invention.
Figure 6:
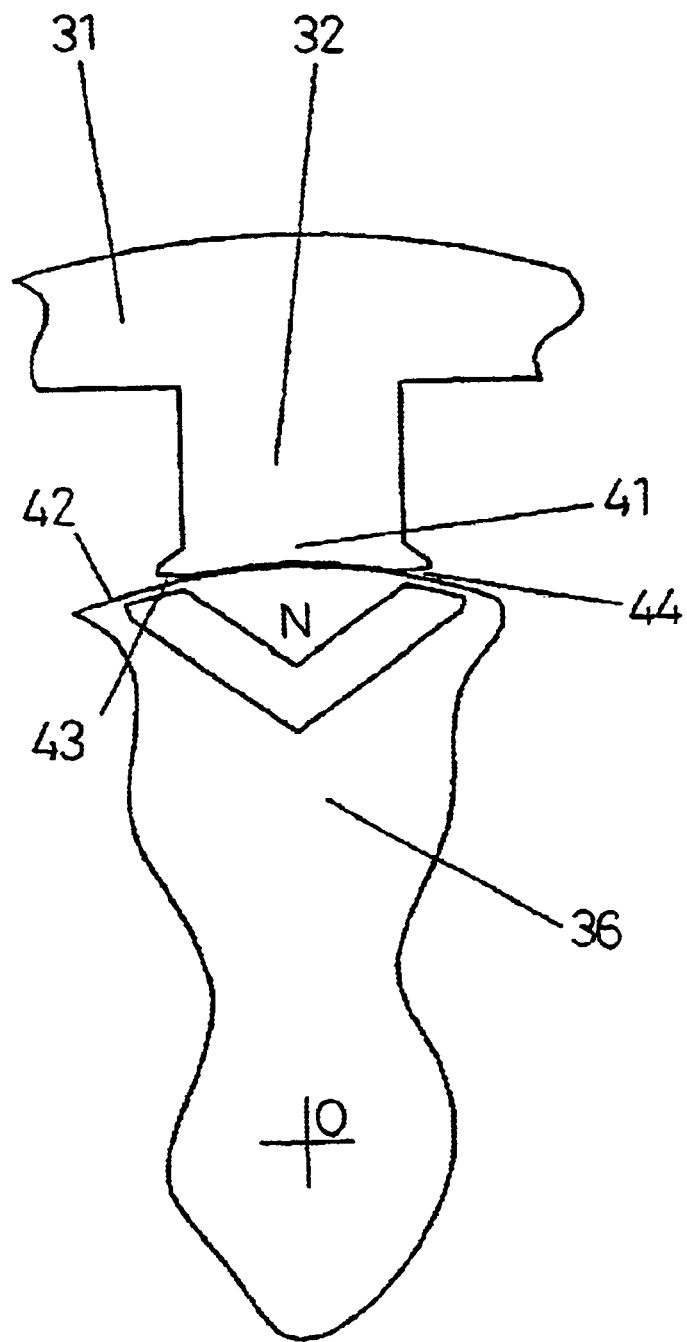
FIG. 6 is a partially enlarged view describing the stator core according to the same embodiment.

FIG. 5 and FIG. 6 are figures for describing a motor generator according to a second embodiment of the present invention, wherein FIG. 5 is a schematic cross-sectional view of the stator core and the rotor which opposes the inside peripheral surface of the core, along a surface perpendicular to the central rotational axis, and FIG. 6 is a partially enlarged view describing the shape of the teeth which constitute the stator core.

As shown in FIG. 5, a stator core 31 comprises first teeth 32 wound with first winding groups 34, and second teeth 33 wound with second winding groups 35, in the same manner as the first embodiment described above. There are a total of nine first teeth 32 around which the first windings 34 are wound, which are divided into three groups, group I to which U phase voltage is applied, group II to which V phase voltage is applied, and group III to which W phase voltage is applied, and the second teeth 33 around which are wound the second windings 35 are provided between the groups I, II, and III. Furthermore, in the same manner as for the first embodiment described above, the winding direction of the first winding groups 34 which are wound around the first teeth 32 in the groups I, II, and III is the opposite direction to that of adjacent first teeth 32 within the same group, so that the polarity of the first winding groups of adjacent first teeth 32 reverses in an alternating manner. At this time, the first winding groups 34 for the first teeth 32 are connected in series, but may also be connected in parallel. In the same manner, the first winding groups 34 are wound around the first teeth 32 in the other groups using the same method, thereby forming a three-phase winding consisting of the U phase, V phase and W phase for each group, which are arranged with a phase difference of 120 degrees in terms of the electrical angle, thereby forming a star connection. Furthermore, a permanent magnet embedded type rotor 36 is provided in a freely rotatable manner about the center of rotation O, leaving a slight gap between the permanent magnet embedded rotor 36 and the first and second teeth. Moreover, at this time, the permanent magnets 7 are arranged such that the magnetic fields of adjacent permanent magnets 7 have different orientations.

Furthermore, in the same manner as for the first embodiment described above, a setup is used which satisfies the equations (2) above when the number of rotor poles is 10m, the total number of slots formed between adjacent first teeth 32 is 9m, the total number of slots formed between adjacent second teeth 33 is 3m (where in each case m is a positive integer), the angle of the section of the first teeth 32 that opposes the rotor is $\theta_1$ [rad], and the angle of the section of the second teeth 33 that opposes the rotor is $\theta_2$ [rad].

FIG. 6 is a partially enlarged view of the first teeth 32 in FIG. 5, and is described below. At each edge in the circumferential direction of the tip 41 of the first teeth 32 which constitute the stator core 31, the surface of the tip 41 of the first teeth 32 that opposes the stator opposing surface 42 of the rotor 36 is formed in a shape which has notches 43, 44 near the edges in the circumferential direction, which are angled away from the stator opposing surface 42 of the rotor 36. The notch 43 and the notch 44 are preferably of approximately equal size.

In the second embodiment, the tips of all the first teeth 32 are formed with this same shape, thereby forming the stator core 31. By forming the tips of the first teeth 32 in such a manner, it is possible to alleviate rapid magnetic field variation in the first teeth 32, which brings the waveform of the counter-electromotive force closer to a sinusoidal wave, thereby reducing torque ripple and cogging torque.

As described above, according to the second embodiment, by forming the rotor opposing surface of the tip of the first teeth in a shape wherein the edges in the circumferential direction of the tips are angled away from the stator opposing surface of the rotor 36, rapid magnetic field variation in the first teeth 32 is alleviated, and therefore high torque is generated, while bringing the waveform of the generated voltage closer to a sinusoidal wave, enabling torque ripple and cogging torque to be reduced, and in addition enabling distortion in the generated voltage to be suppressed, and accordingly, iron loss is also suppressed, enabling the realization of an extremely efficient motor generator.

By employing such a construction, in the same manner as in the first embodiment, it is possible to perform power running in the first winding groups 34 using the high voltage battery (by applying a voltage), thereby driving the motor generator, and to perform regeneration in the second winding groups 35 (by producing a voltage), thereby charging the low voltage battery.

Here, the second winding groups 35 are set so as to have fewer second teeth 33 wound with windings than the first winding groups 34, but because the output is lower than the first winding groups 34, adequate generation characteristics is ensured.

Furthermore, even when both the first winding groups 34 and the second winding groups 35 are used for regeneration, even if the generated voltage during regeneration is high in the first winding groups 34, low voltage is obtained from the second winding groups 35. For example, the generated voltage produced at the rated speed in the first winding groups 34 may be used as the voltage for the high voltage battery for the high voltage systems, and the voltage produced in the second winding groups 35 may be used as the voltage for the low voltage battery for the low voltage systems. Accordingly, the requirement in conventional systems to either provide a separate motor generator for the low voltage battery, or provide a DC—DC converter in addition to the motor generator, is eliminated.

Furthermore, by setting the width of the second teeth 33, which are wound with the second winding groups 35, to an appropriate width, when the magnetic flux within the second teeth 33 reaches a certain level, the amount of magnetic flux is suppressed due to magnetic saturation, thereby keeping the generated voltage produced by the second winding groups 35 low even during high-speed rotation.

In addition, when at even higher rotational speeds, by applying field weakening control to the first winding groups 34, it is possible to both suppress the voltage of the first winding groups 34 to the level of the allowable voltage of the high voltage battery of the high voltage systems, and suppress the voltage of the second winding groups 35 to the level of the allowable voltage of the low voltage battery.

Third Embodiment

Figure 7A:
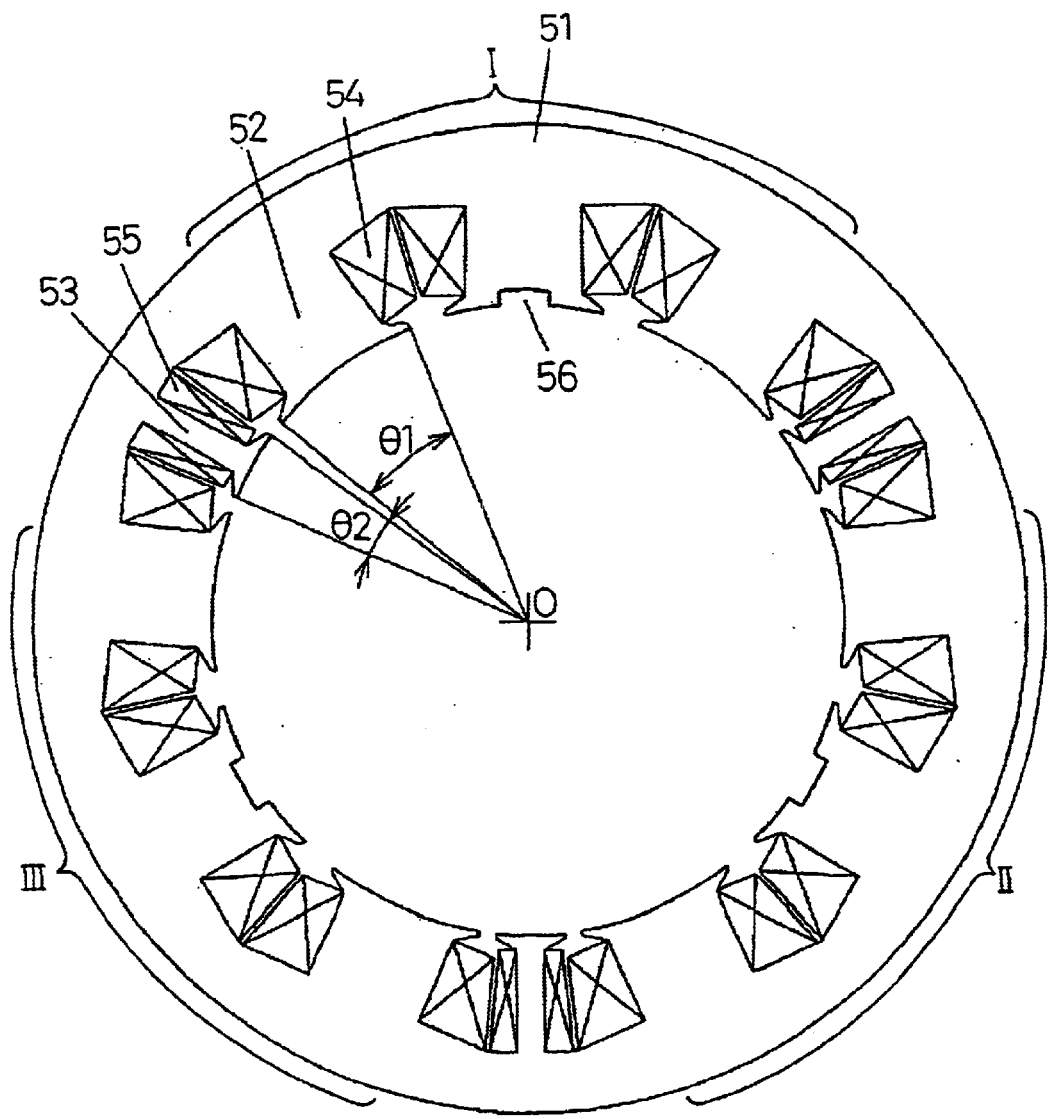
FIG. 7A is a schematic cross-sectional view describing the stator core according to a third embodiment of the present invention.
Figure 7B:
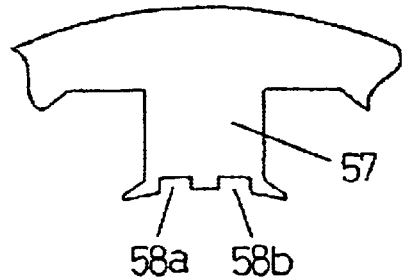
FIG. 7B is a partial view showing an example of a method of forming the concave sections according to the same embodiment.
Figure 7C:
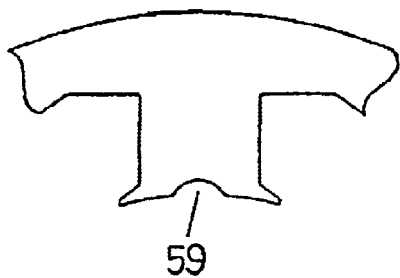
FIG. 7C is a partial view showing an example of the shape of the concave sections according to the same embodiment.

FIG. 7A through FIG. 7C are figures for describing a motor according to a third embodiment of the present invention, and are schematic top plan views showing the stator core.

As shown in FIG. 7A, a stator core 51 comprises first teeth 52 wound with first winding groups 54, and second teeth 53 wound with second winding groups 55, in the same manner as for the first embodiment described above. There are a total of nine first teeth 52 around which the first windings 54 are wound, which are divided into three groups, namely group I to which U phase voltage is applied, group II to which V phase voltage is applied, and group III to which W phase voltage is applied, and the second teeth 53 around which are wound the second windings 55 are provided between the groups I, II, and III. Furthermore, in the same manner as for the first embodiment described above, the winding direction of the first winding groups 54 which are wound around the first teeth 52 in the groups I, II, and III is the opposite direction to that of adjacent first teeth 52 within the same group, so that the polarity of the first winding groups of adjacent first teeth 52 reverses in an alternating manner. At this time, the first winding groups 54 for the first teeth 52 are connected in series, but may also be connected in parallel. In the same manner, the first winding groups 54 are wound around the first teeth 52 in the other groups using the same method, thereby forming a three-phase winding consisting of the U phase, V phase, and W phase for each group, which are arranged with a phase difference of 120 degrees in terms of the electrical angle, thereby forming a star connection. Furthermore, a permanent magnet embedded rotor (not shown in the drawings) is provided in a freely rotatable manner about the center of rotation O, leaving a slight gap between the permanent magnet embedded rotor and the first and second teeth. Moreover, at this time, the permanent magnets (not shown in the drawings) are arranged such that the magnetic fields of adjacent permanent magnets have different orientations.

Furthermore, in the same manner as for the first embodiment described above, a setup is used which satisfies the equations (2) above when the number of rotor poles is 10m, the total number of slots formed between adjacent first teeth 52 is 9m, the total number of slots formed between adjacent second teeth 53 is 3m (where in each case m is a positive integer), the angle of the section of the first teeth 52 that opposes the rotor is θ1 [rad], and the angle of the section of the second teeth 53 that opposes the rotor is θ2 [rad].

As follows is a description of the shape of the tip sections of the first teeth 52. In the case of the first teeth 52 positioned in the center of each of the groups I, II, and III, a substantially rectangular shaped concave section 56 is formed in the surface of the tip section that opposes the rotor (not shown in the drawings) so as to divide the rotor opposing surface lengthwise in the circumferential direction into three substantially equal parts, with the concave section 56 formed in the center of the divided opposing surface. By forming the concave sections 56 in these first teeth 52, if the first teeth 52 are magnetized by the winding groups 54 wound around the first teeth 52 to an S pole, for example, then the concave sections 56 behave as apparent N poles. Accordingly, as a result of the concave sections 56, the magnetic poles at the tip sections of the first teeth 52 appear to be subdivided into an S pole, an N pole and an S pole. The same concave sections are formed in the first teeth 52 positioned in the center of the other groups, and hence for each group, the magnetic poles at the tip sections of these first teeth appear to be subdivided into an S pole, an N pole and an S pole. As a result, high torque is generated, while torque ripple is suppressed.

Moreover, the number of concave sections is not limited to one, and as shown in FIG. 7B, two concave sections 58a and 58b may be formed in the tip section of the first teeth 57, and even three or more concave sections are possible. Furthermore, the shape of the concave sections is not limited to a rectangular shape, and as shown in FIG. 7C, a circular arc concave section 59 may be provided, or needless to say, a plurality of circular arc concave sections. Furthermore, the invention is not restricted to the case in which the first teeth 52 in which the concave sections are formed are positioned only at the center of each group, and configurations in which similar concave sections are provided in other first teeth 52 in the group may also be used, as may configurations in which similar concave sections are provided in the tip sections of the second teeth as well as the first teeth.

Furthermore, it is also possible to form the notches provided at the edges in the circumferential direction of the tip section of the first teeth, as described in the second embodiment, in addition to the concave sections formed in the tip sections of the first teeth 52 in the third embodiment.

As described above, according to the third embodiment, by forming either one, or a plurality of rectangular or circular arc shaped concave sections in the tip sections of the central first tooth 52 in each of the three groups I, II, and III, similar effects to the first embodiment are achieved in that reluctance torque is utilized in addition to magnet torque, resulting in increased torque, while suppressing torque ripple, and in addition, distortion in the generated voltage is suppressed, enabling iron loss to be reduced, and demagnetization of the permanent magnets to be prevented, thereby realizing an extremely efficient motor generator.

By employing such a construction, in the same manner as in the first embodiment and the second embodiment, it is possible to perform power running in the first winding groups 54 using the high voltage battery (by applying a voltage), thereby driving the motor generator, and to perform regeneration in the second winding groups 55 (by producing a voltage), thereby charging the low voltage battery.

Here, the second winding groups 55 are set so as to have fewer second teeth 53 wound with windings than the first winding groups 54, but because the output is lower than the first winding groups 54, adequate generation characteristics is ensured.

Furthermore, even when both the first winding groups 54 and the second winding groups 55 are used for regeneration, even if the generated voltage during regeneration is high in the first winding groups 54, low voltage is obtained from the second winding groups 55. For example, the generated voltage produced at the rated speed in the first winding groups 54 may be used as the voltage for the high voltage battery for the high voltage systems, and the voltage produced in the second winding groups 55 may be used as the voltage for the low voltage battery for the low voltage systems. Accordingly, the requirement in conventional systems to either provide a separate motor generator for the low voltage battery, or provide a DC—DC converter in addition to the motor generator, is eliminated.

Furthermore, by setting the teeth width of the second teeth 53, which are wound with the second winding groups 55, to an appropriate width, when the magnetic flux within the second teeth 53 reaches a certain level, the amount of magnetic flux is suppressed due to magnetic saturation, thereby keeping the generated voltage produced by the second winding groups 55 low even during high-speed rotation.

In addition, when at even higher rotational speeds, by applying field weakening control to the first winding groups 54, it is possible to both suppress the voltage of the first winding groups 54 to the level of the allowable voltage of the high voltage battery of the high voltage systems, and suppress the voltage of the second winding groups 55 to the level of the allowable voltage of the low voltage battery.

Fourth Embodiment

FIG. 8A through FIG. 8D are cross-sectional views showing other examples of the shape of the rotor core, and the permanent magnets embedded in the rotor core. In the first through third embodiments above, the rotor comprises a rotor core and a plurality of substantially V shaped permanent magnets embedded in the rotor core at equal intervals around the circumferential direction, and the rotor is provided in a freely rotatable manner about the central rotational axis O, leaving a slight gap between the stator opposing surface of the rotor and the rotor opposing surface (that is the rotor opposing surfaces at the tip sections of the first and second teeth) of the stator.

Figure 8A:
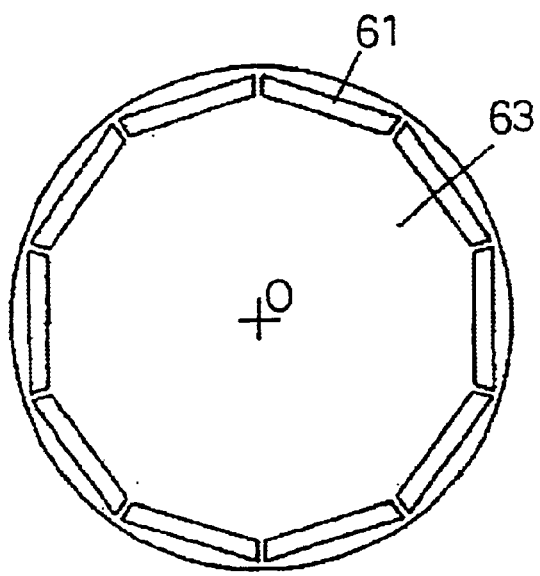
FIG. 8A is a schematic cross-sectional view of a rotor, describing an example of the shape of the permanent magnets according to a fourth embodiment of the present invention.
Figure 8B:
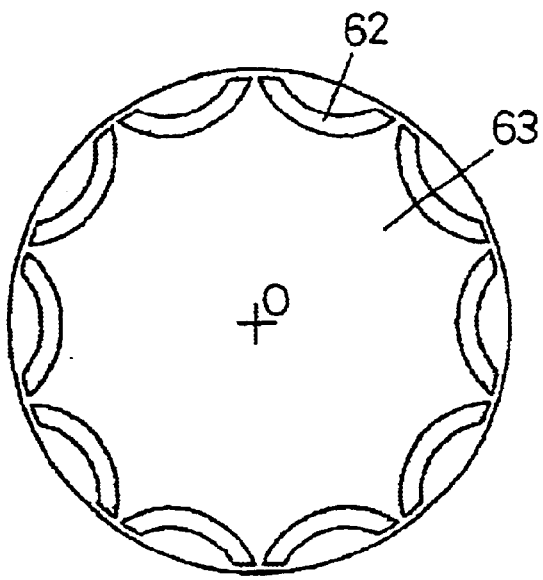
FIG. 8B is a schematic cross-sectional view of the rotor, describing an alternative shape of the permanent magnets according to the same embodiment.
Figure 8C:
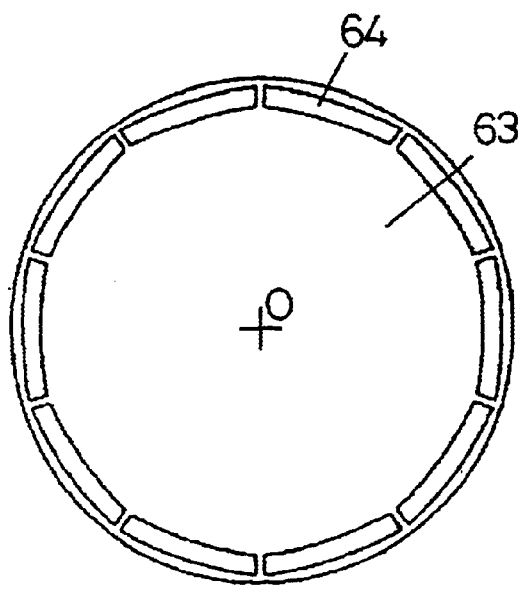
FIG. 8C is a schematic cross-sectional view of the rotor, describing yet another shape of the permanent magnets according to the same embodiment.

The permanent magnets may be straight permanent magnets 61 which are perpendicular to the radial direction as shown in FIG. 8A, permanent magnets 62 in the shape of circular arcs that protrude away from the stator as shown in FIG. 8B, or permanent magnets 64 in the shape of circular arcs that protrude towards the stator and have radii greater than the radius of the rotor core 63 as shown in FIG. 8C. Furthermore, as shown in FIG. 8D, the rotor may be constructed comprising permanent magnets 65 embedded in a rotor core 63, and the rotor core 63 which is provided with slits 66 that are positioned on the opposite side of the permanent magnets 65 to the stator (not shown in the drawings), and have approximately the same shape as the permanent magnets 65, but with a slightly narrower width.

Figure 8D:
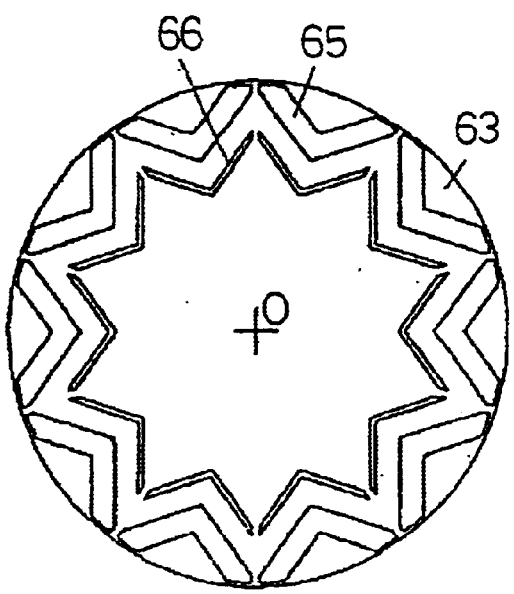
FIG. 8D is a schematic cross-sectional view of the rotor, showing an example of the shape of the rotor core according to the same embodiment.

As shown in FIG. 8D, by providing the slits 66 near the permanent magnets 65, the slits 66 impede the passage of the magnetic flux, reducing the d-axis inductance and increasing the difference between the d-axis inductance and the q-axis inductance, thereby making it possible to produce a larger amount of reluctance torque, and increasing the amount of generated torque of the motor. Furthermore, even with this slitted rotor core 63, the shape of the permanent magnets may be straight, a circular arc protruding away from the stator, or a circular arc protruding in the direction of the stator, as shown in FIG. 8A to FIG. 8C, respectively.

With the construction according to the fourth embodiment above, by employing a construction in which the teeth of the stator and the winding groups wound on those teeth are divided into three groups, namely the U phase, the V phase, and the W phase, and the polarity of adjacent winding groups within the same group is reversed, and a construction in which there are embedded permanent magnets shaped such that the distance between the stator opposing surface of the rotor and the stator side surfaces is larger at the center than at the edges of the stator side surfaces, reluctance torque is utilized in addition to magnet torque, resulting in increased torque, and in addition, distortion in the generated voltage is suppressed, enabling iron loss to be reduced, and demagnetization of the permanent magnets to be prevented, thereby realizing an extremely efficient motor generator.

By employing such a construction, in the same manner as in the first through third embodiments, it is possible to perform power running in the first winding groups (not shown in the drawings) using the high voltage battery (by applying a voltage), thereby driving the motor generator, and to perform regeneration in the second winding groups (not shown in the drawings) (by producing a voltage), thereby charging the low voltage battery.

At this time, even if the number of second teeth (not shown in the drawings) wound with the second winding groups is set to a smaller value than the number of first teeth (not shown in the drawings) wound with the first winding groups, because the output of the second winding groups is lower than the first winding groups, adequate generation characteristics is ensured.

Furthermore, even when both the first winding groups and the second winding groups are used for regeneration, even if the generated voltage during regeneration is high in the first winding groups, low voltage is obtained from the second winding groups. For example, the generated voltage produced at the rated speed in the first winding groups may be used as the voltage for the high voltage battery for the high voltage systems, and the voltage produced in the second winding groups may be used as the voltage for the low voltage battery for the low voltage systems. Accordingly, the requirement in conventional systems to either provide a separate motor generator for the low voltage battery, or provide a DC—DC converter in addition to the motor generator, is eliminated.

Furthermore, by setting the width of the second teeth, which are wound with the second winding groups, to an appropriate width, when the magnetic flux within the second teeth reaches a certain level, the amount of magnetic flux is suppressed due to magnetic saturation, thereby keeping the generated voltage produced by the second winding groups low, even during high-speed rotation.

In addition, when at even higher rotational speeds, by applying field weakening control to the first winding groups, it is possible to both suppress the voltage of the first winding groups to the level of the allowable voltage of the high voltage battery of the high voltage systems, and suppress the voltage of the second winding groups to the level of the allowable voltage of the low voltage battery.

Fifth Embodiment

Furthermore, in the first through third embodiments described above, the case of a so-called inner rotor type motor generator in which the rotor is positioned inside the stator was described, but needless to say, an outer rotor type motor generator in which the rotor is positioned outside of the stator may also be used. Hereinafter, a permanent magnet embedded type outer rotor type motor generator is described with reference to FIG. 9.

Figure 9:
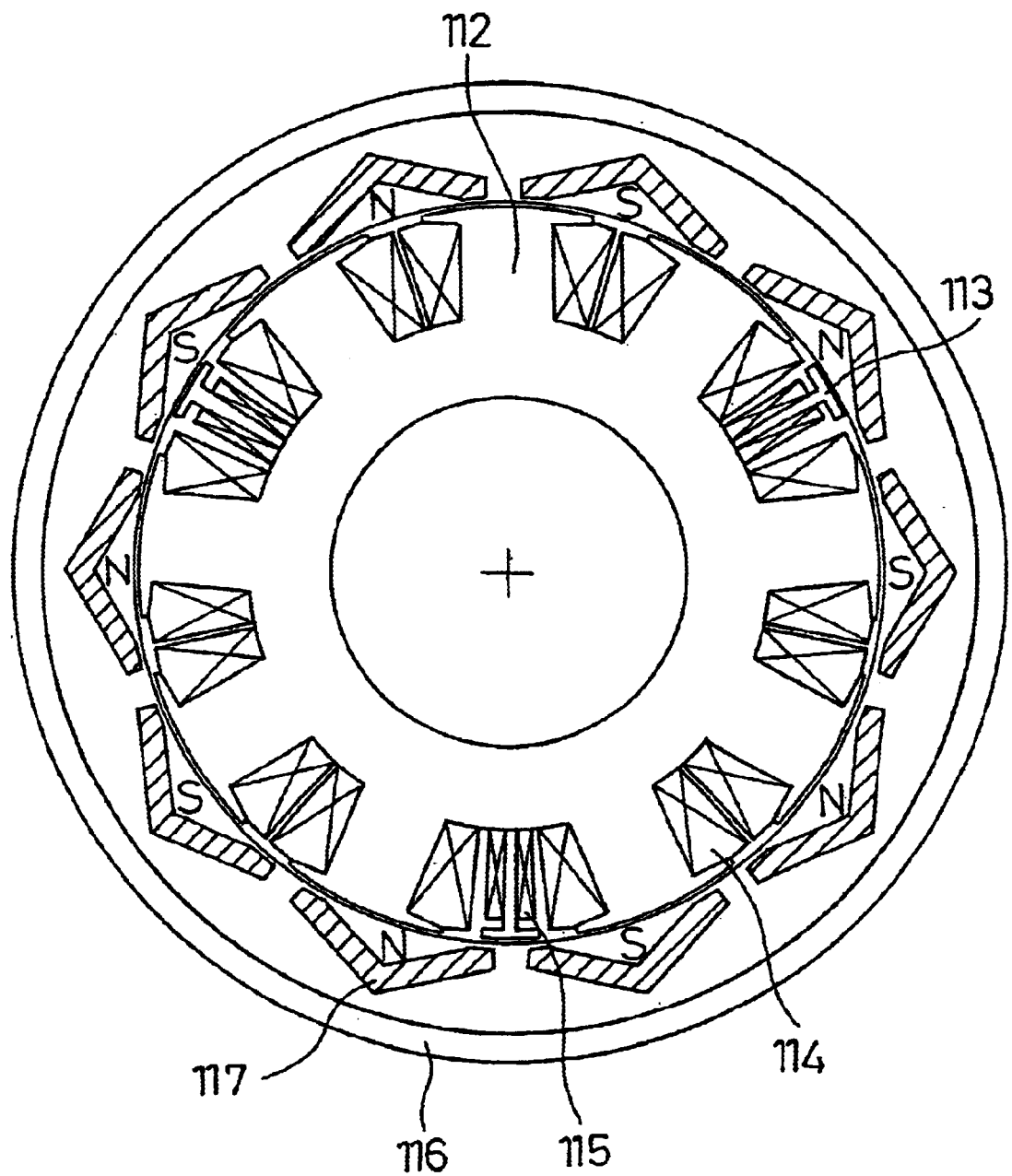
FIG. 9 is a schematic cross-sectional view describing the main elements of an outer rotor type motor generator according to a fifth embodiment of the present invention.

In FIG. 9, the stator comprises nine first teeth 112 wound with first winding groups 114, and the entire stator comprises three groups of these first teeth 112, each group having three first teeth 112. In the same manner as in the first through third embodiments, a U phase voltage is applied to the first group, a V phase voltage is applied to the second group, and a W phase voltage is applied to the third group, and the winding direction of the first winding groups 114 wound around the first teeth 112 in each group is opposite in adjacent first teeth 112. In addition, between each group, second teeth 113 wound with second winding groups 115 are formed, arranged with a phase difference of 120 degrees in terms of the electrical angle, thereby forming a star connection.

Furthermore, a rotor core 116, in which are embedded substantially V shaped permanent magnets 117 that are positioned outside the stator in the radial direction, with a slight gap between the rotor core and the tip sections of the first and second teeth 112 and 113 in the stator, is provided so as to be freely rotatable about the center of rotation O.

By using an outer rotor type motor generator of such a construction, in the same manner as in the first embodiment through the third embodiment, it is possible to perform power running in the first winding groups 114 using the high voltage battery (by applying a voltage), thereby driving the motor generator, and to perform regeneration in the second winding groups 115 (by producing a voltage), thereby charging the low voltage battery.

At this time, even if the number of second teeth 113 wound with the second winding groups 115 is set to a smaller value than the number of first teeth 112 wound with the first winding groups 114, because the output of the second winding groups 115 is lower than the first winding groups 114, sufficient power generation characteristics is ensured.

Furthermore, even when both the first winding groups 114 and the second winding groups 115 are used for regeneration, even if the generated voltage during regeneration is high in the first winding groups 114, low voltage is obtained from the second winding groups 115. For example, the generated voltage produced at the rated speed in the first winding groups 114 may be used as the voltage for the high voltage battery for the high voltage systems, and the voltage produced in the second winding groups 115 may be used as the voltage for the low voltage battery for the low voltage systems. Accordingly, the requirement in conventional systems to either provide a separate motor generator for the low voltage battery, or provide a DC—DC converter in addition to the motor generator, is eliminated.

Furthermore, by setting the width of the second teeth 113, which are wound with the second winding groups 115, to an appropriate width, when the magnetic flux within the second teeth 113 reaches a certain level, the amount of magnetic flux is suppressed due to magnetic saturation, thereby keeping the generated voltage produced by the second winding groups 115 low, even during high-speed rotation.

In addition, when at even higher rotational speeds, by applying field weakening control to the first winding groups 114, it is possible to both suppress the voltage of the first winding groups 114 to the level of the allowable voltage of the high voltage battery of the high voltage systems, and suppress the voltage of the second winding groups 115 to the level of the allowable voltage of the low voltage battery.

Moreover, it is also possible to use a construction in which notches are provided at the edges in the circumferential direction of the tip sections of the first teeth 112, in the same manner as described in the second embodiment, or to provide concave sections in these tip sections as described in the third embodiment. Furthermore, the rotor may also have a configuration equipped with either straight or circular arc shaped permanent magnets, as described in the fourth embodiment.

Sixth Embodiment

Figure 10:
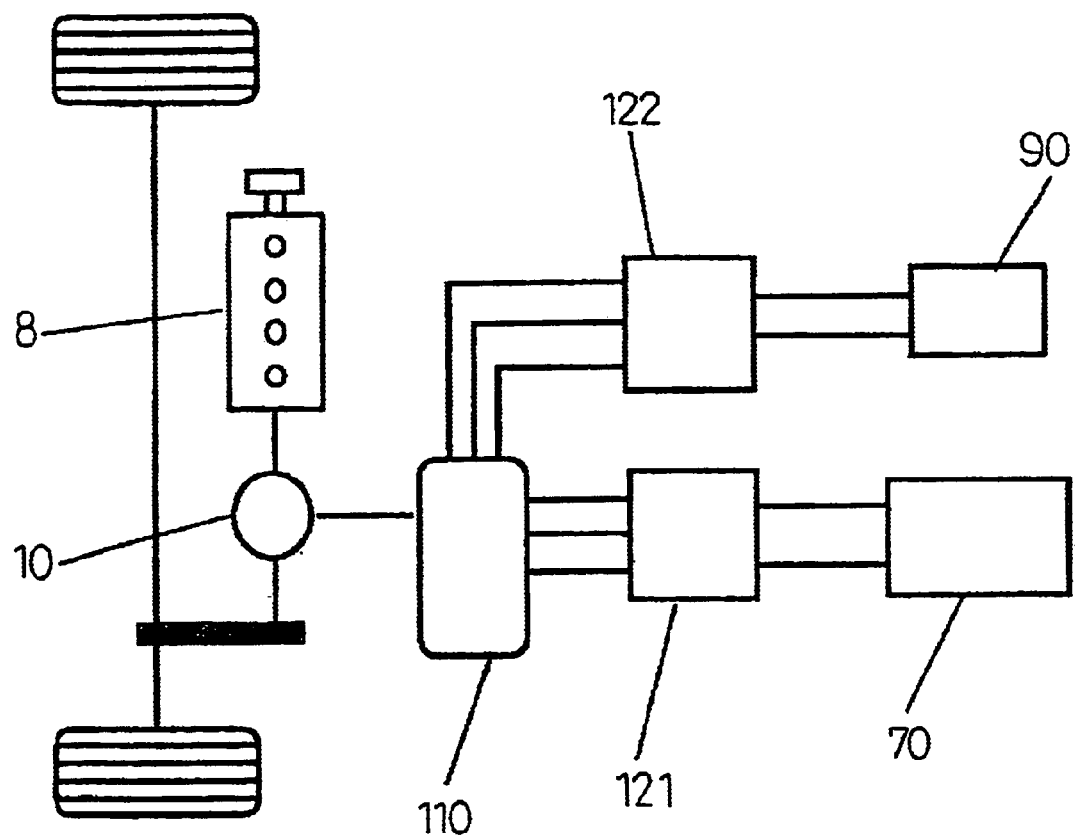
FIG. 10 is a schematic illustration showing the construction of a hybrid vehicle according to a sixth embodiment of the present invention.

FIG. 10 is a schematic illustration showing the construction of a hybrid vehicle according to a sixth embodiment of the present invention, which is equipped with a motor generator comprising two types of windings in a mechanically and electrically independent configuration.

In FIG. 10, the reference numeral 8 indicates an engine and the reference numeral 110 indicates an electric motor, wherein power from the engine 8, the electric motor 110, or both the engine 8 and the electric motor 110, is transmitted to the tires via a power switching mechanism 10. The electric motor 110 has two independent windings, and any of the motor generators from the first through fifth embodiments described above may be used as this motor. Of the electrically and mechanically independent two types of windings, the terminals of the first windings are connected to a high voltage battery 70 via a power conversion device 121, and the terminals of the other windings are connected to a low voltage battery 90 via a power conversion device 122, and because the two types of windings are mechanically and electrically independent in this motor configuration, insulation is easily ensured.

One of the types of windings is connected to the high voltage battery 70, and the power produced by these windings allows the vehicle to travel. The other windings are connected to the low voltage battery 90, and are operated as a generator for charging the low voltage battery 90.

By connecting the windings in this manner, it is possible to charge the low voltage battery 90 even when running the vehicle by means of the motor, meaning it is possible to charge the low voltage battery 90 without providing separate components such as an alternator or a DC—DC converter, which contributes to reductions in both the cost and the space occupied.

Figure 17:
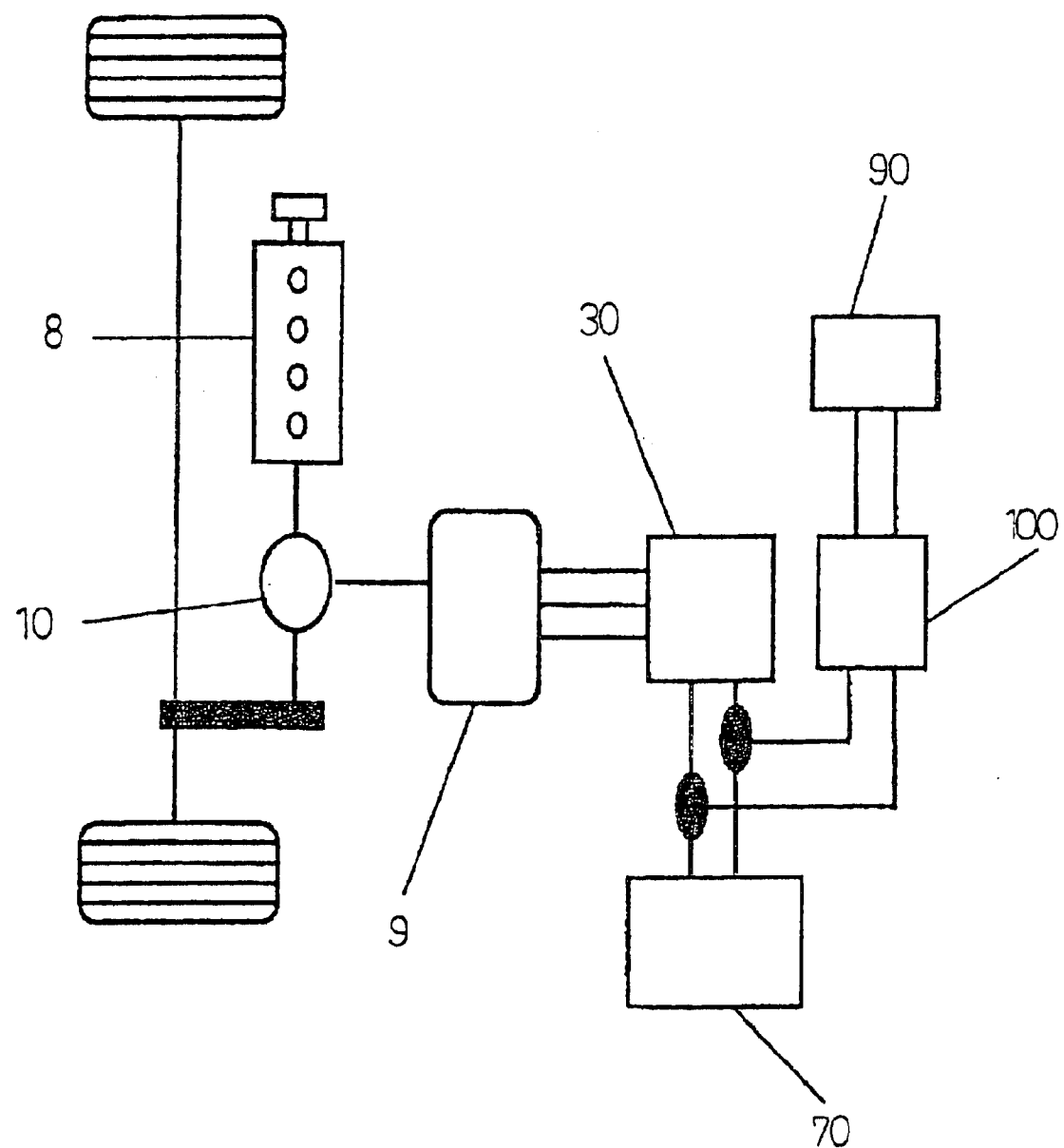
FIG. 17 is a schematic illustration showing the construction of a conventional hybrid vehicle equipped with a motor generator and a DC—DC converter.

Furthermore, in a system in which the low voltage battery 90 is charged from the high voltage battery 70 via a DC—DC converter 100, as in the conventional configuration shown in FIG. 17, if the high voltage battery 70 breaks down for some reason, then depending on the load status of the low voltage battery 90, there is a possibility that the low voltage battery 90 may be discharged, rendering the vehicle unable to travel. However, according to the sixth embodiment, because the high voltage systems and the low voltage systems are independent, even if a failure occurs in the high voltage systems, low voltage continues to be supplied in a stable manner, thereby functioning as a backup for the low voltage power source.

Figure 11:
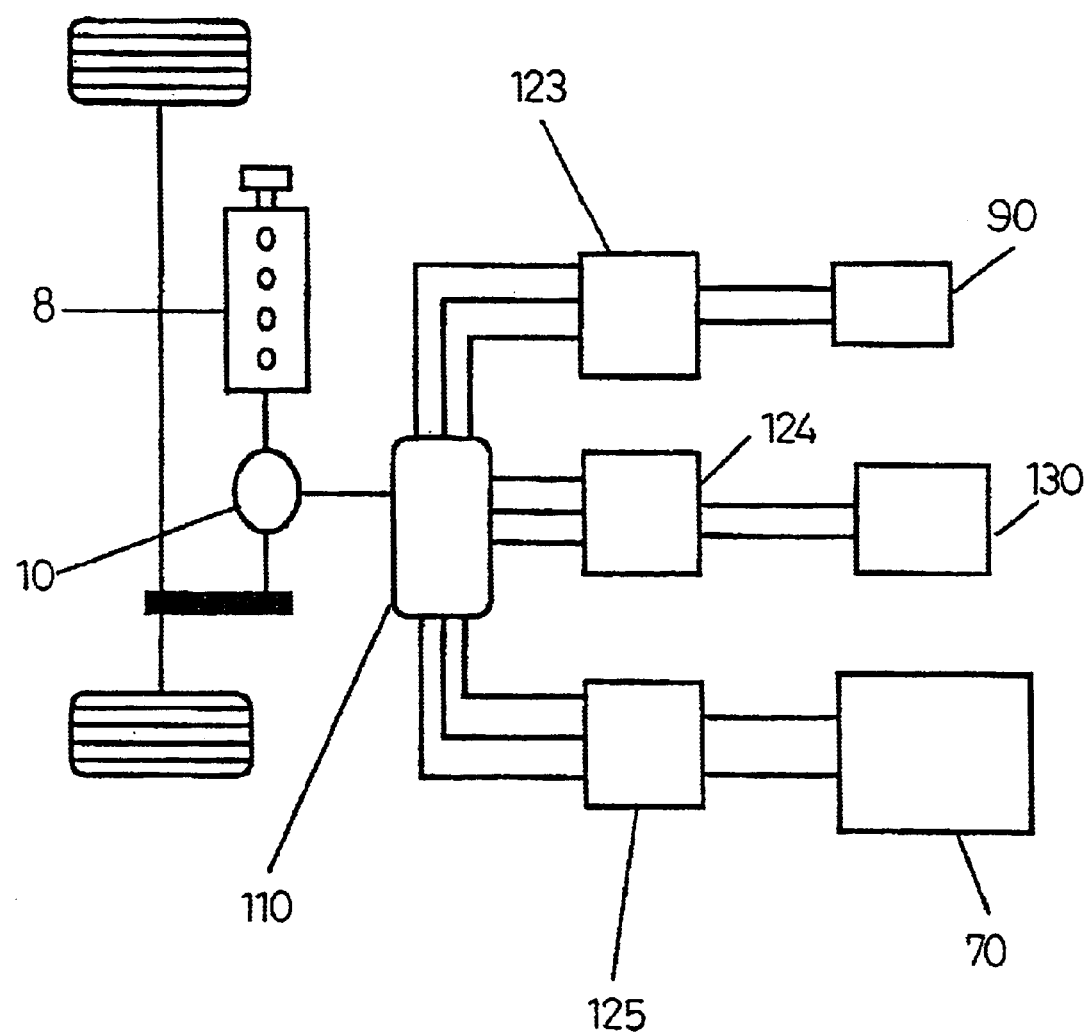
FIG. 11 is a schematic illustration showing the construction of another hybrid vehicle according to the same embodiment.

FIG. 10 was described for a configuration in which there were two (two types of) windings which were mechanically and electrically independent, but FIG. 11 is an explanatory diagram of a configuration in which there are three (three types of) windings which are mechanically and electrically independent. In FIG. 10, the reference numeral 90 indicates a 12V power source, the reference numeral 130 indicates a 42V power source, and the reference numeral 70 indicates a 240V power source, and in a vehicle equipped with this plurality of different power sources, the power source with the highest voltage of 240V is used as the motor for driving the vehicle, the 42V power source is used for loads which have relatively large power consumption such as air conditioning and power steering, and the 12V power source is used for loads which have relatively low power consumption, such as lamps and audio systems. By providing power sources that suit the load capacity, each device will be used within an efficient range, which leads to smaller and lighter devices.

Providing a dedicated generator for each power source would mean an increase in the space occupied by the generators and an increase in weight, which would eliminate the advantages of having a variety of power supply voltages. However, according to the sixth embodiment, there is no need to reserve space individually for the generators, and it is possible to perform charging control individually for the 12V system, the 42V system, and the 240V system.

Here, two of the three mechanically and electrically independent windings are wound around two types of teeth provided on the stator, in the same manner as the construction above for a motor comprising two types of windings, and the remaining windings are wound so as to overlap either one of the two mechanically and electrically independent windings.

Seventh Embodiment

Figure 12:
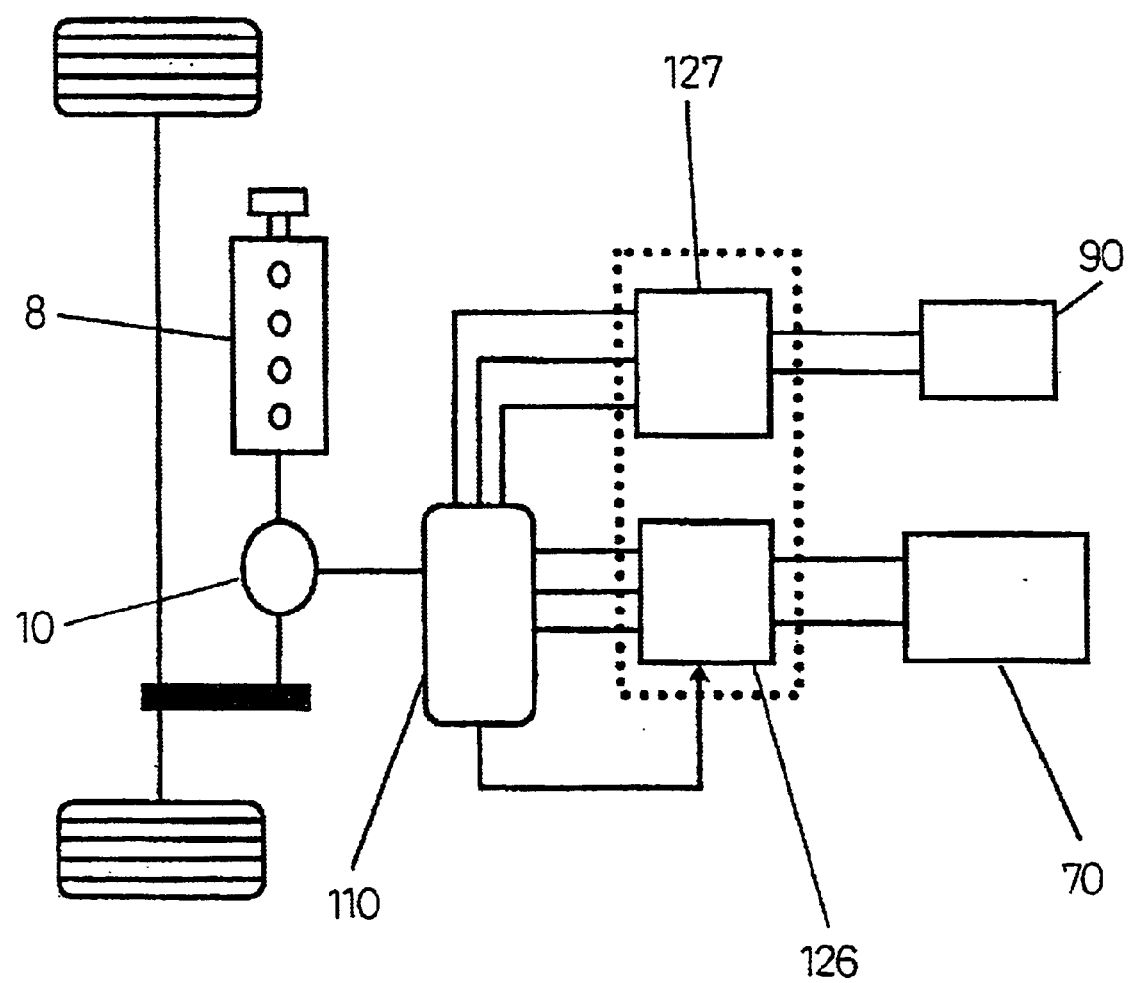
FIG. 12 is a schematic illustration showing the construction of a hybrid vehicle according to a seventh embodiment of the present invention.

FIG. 12 is a schematic illustration showing the construction of a hybrid vehicle equipped with a motor generator according to a seventh embodiment of the present invention.

In FIG. 12, the reference numeral 8 indicates an engine and the reference numeral 110 indicates an electric motor, wherein power from the engine 8, the electric motor 110, or both the engine 8 and the electric motor 110 is transmitted to the tires via a power switching mechanism 10. The electric motor 110 has two independent windings, and any of the motor generators from the first through fourth embodiments described above may be used as this motor. Of the two independent windings, the terminals of the first windings are connected to a high voltage battery 70 via a power conversion device 126. The terminals of the other windings are connected to a low voltage battery 90 via a power conversion device 127.

Figure 13:
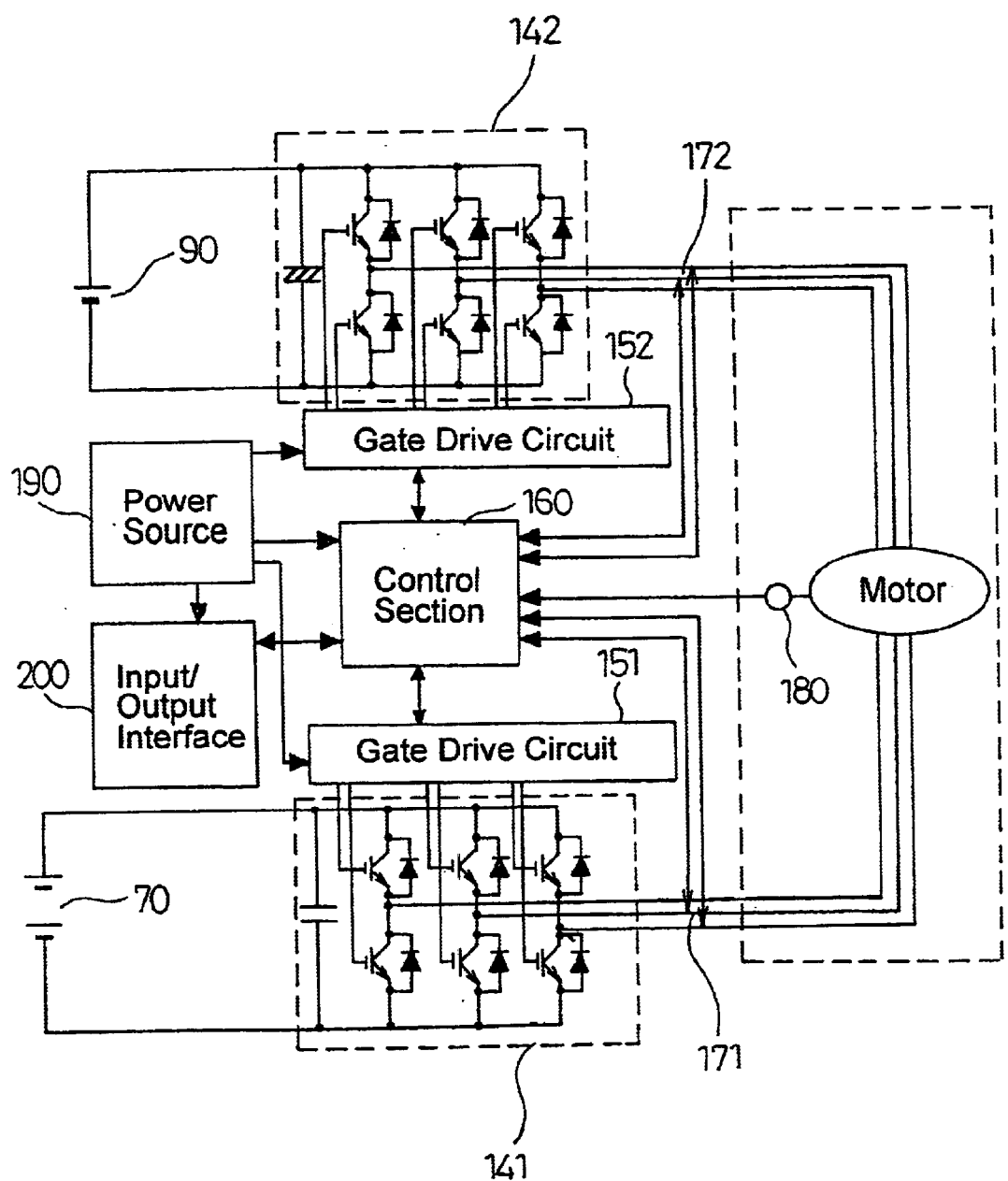
FIG. 13 is a block diagram showing the construction of a power conversion device according to the same embodiment.

In a system according to the seventh embodiment, with the construction shown in FIG. 12, the power conversion devices are composed of inverters. As shown in FIG. 13, the present system comprises inverters 141, 142 composed of switching elements, gate drive circuits 151, 152 for driving the switching elements of the inverters, a control section 160 for controlling the inverters, electric current detection sensors 171, 172 for detecting the motor current, a position detection sensor 180 for detecting the magnetic pole positions of the motor, and a power source 190.

Instructions for the motor are input from an input/output interface 200, and the current flowing in the motor and the positions of the magnetic poles in the motor are input into the control section 160 from the electric current detection sensors 171, 172 and the position detection sensor 180 respectively, and according to the input from each of these sensors, calculations for controlling the motor according to the input instructions are performed in the control section 160, and the results of these calculations drive the switching elements of the inverters 141, 142, via the gate drive circuits 151, 152, thereby controlling the motor. If the control section 160 is composed of a microprocessor, then in order to control the second windings or other windings, that is, in order to control the motor, the control section 160, the magnetic pole position sensor 180, and the power source 190 are shared as shown in FIG. 11, which reduces the number of structural components when compared to a case where the two motors are controlled independently, and contributes to reductions in both the cost and the size.

Eighth Embodiment

An eighth embodiment of the present invention is described below. The description is based on the system configurations described in the sixth and seventh embodiments.

Figure 14:
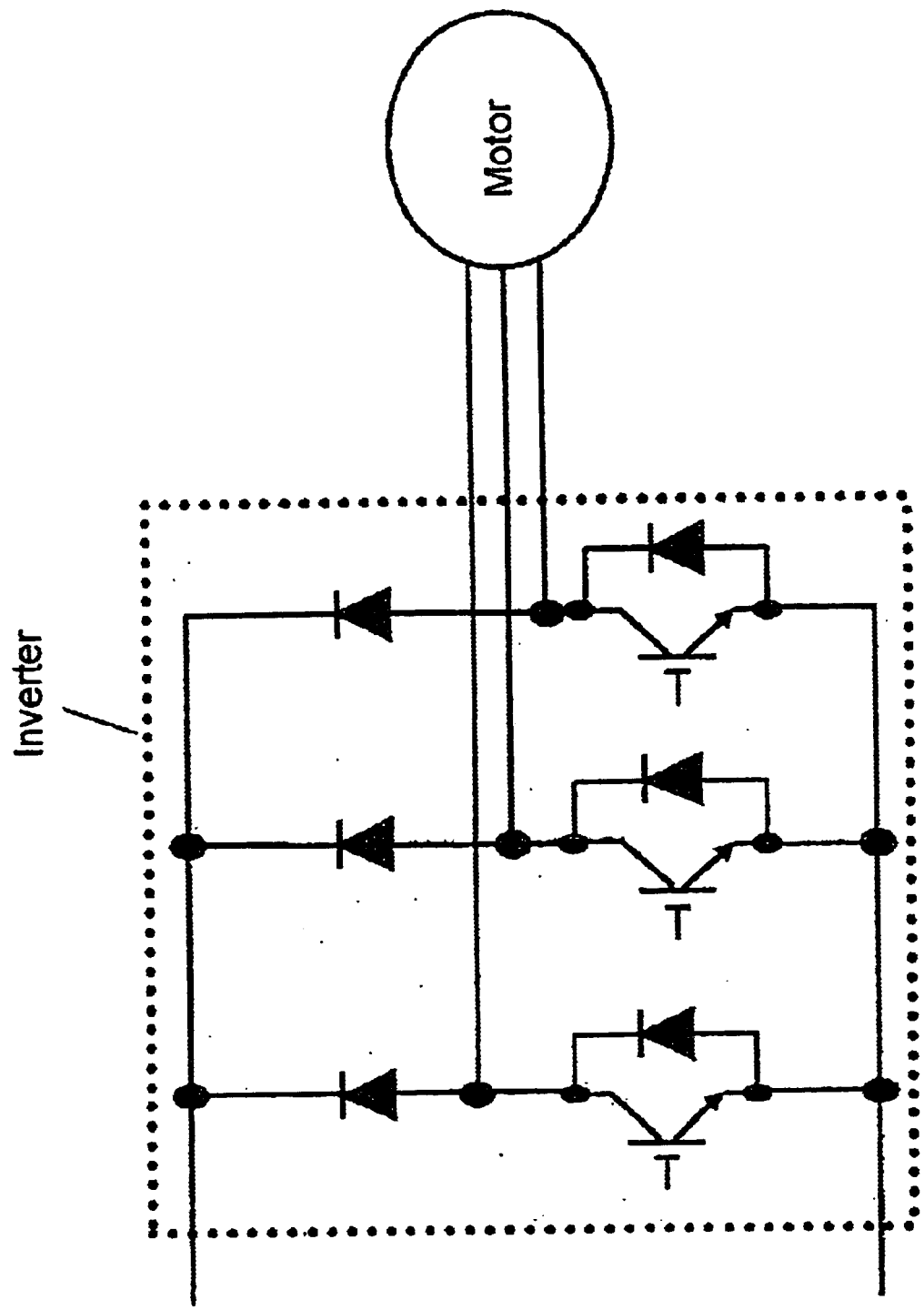
FIG. 14 is a block diagram showing the construction of a power conversion device according to an eighth embodiment of the present invention.

The generated voltage produced by the motor depends on the rotational speed of the motor. For example, if the motor produces 10V at 1000 r/min, then at 10000 r/min, 100V is produced. In order to ensure high-speed performance of the vehicle, the main motor for driving the vehicle, that is, the high voltage windings, must rotate at close to 10000 r/min. In contrast, it is necessary to control the low voltage windings generator so as to produce a constant voltage, for example 14V. Accordingly, the low voltage windings are designed so that they produce a rated voltage of 14V at 10000 r/min, and the power conversion device is composed of an inverter. By employing such a configuration, at rotational speeds below 10000 r/min, the generated voltage produced will be equal to, or lower than, 14V. Accordingly, by controlling the inverter in boost mode, a constant voltage of 14V is ensured. FIG. 14 is a structural diagram showing an example in which the power conversion device is composed of an inverter.

By employing the above construction, the 6 switching elements conventionally required will be reduced to 3 switching elements, which contributes to reductions in the number of components, the cost, and the size.

Ninth Embodiment

A ninth embodiment of the present invention is described below. The description is based on the system configurations described in the sixth and seventh embodiments.

The generated voltage produced by the motor depends on the rotational speed of the motor. For example, if the motor produces 10V at 1000 r/min, then at 10000 r/min, 100V is produced. In order to ensure high-speed performance of the vehicle, the main motor for driving the vehicle, that is, the high voltage windings, must rotate at close to 10000 r/min. In contrast, it is necessary to control the low voltage windings generator so as to produce a constant voltage, for example 14V. However, if the low voltage windings are designed so that for rotational speeds varying from approximately 0 to 10000 r/min, they produce a provisional 10V at 1000 r/min for example, then voltages between 0V and 100V are produced, and this voltage must be controlled to a constant 14V. When controlling the voltage to maintain a constant voltage, the smaller the dynamic range of the produced voltage, the easier the voltage is to control. Accordingly, the windings are designed so as to produce the rated voltage of 14V at 5000 r/min, or approximately half the rotational speed, and the power conversion device is composed of an inverter.

At rotational values exceeding the rated voltage, field weakening control is performed, and at rotational values less than the rated voltage, field strengthening control is performed. By switching the control status in this manner, field strengthening is performed to raise the produced voltage for the range where the produced voltage is lower than the rated voltage, and field weakening is performed to lower the produced voltage for the range where the produced voltage is higher than the rated voltage, thereby effectively suppressing the dynamic range by half, and improving controllability.

Here, a method was described in which field control of the produced voltage was performed using an inverter, but the same results will be obtained by passing an electric current through a control winding to vary the magnetic resistance from the magnets, thereby controlling the voltage produced by the second windings.

Tenth Embodiment

A tenth embodiment of the present invention is described hereinafter. In FIG. 15, the reference numeral 4 indicates the first winding groups, which are connected to a high voltage battery 70 via a power conversion device 30. The reference numeral 5 indicates the second winding groups, which are connected to a low voltage battery 90 via a rectifier 300.

When the first winding groups 4 are operating as the motor (power running) and the second winding groups 5 are operating as a generator (regeneration), then by adjusting the rotational speed of the motor by controlling the power of the first winding groups 4 so that the voltage of the low voltage battery 90 remains constant, it is possible to maintain a constant voltage regardless of the load status of the low voltage battery 90.

Moreover, because the motor is rotated by means of the first winding groups 4 (power running) to control the generated power using the energy from the rotation, higher rotational speeds allow smaller and smaller motor generators to be provided.

Moreover, by using the motor generator according to the first through tenth embodiments above as the motor for driving a vehicle such as a PEV (Pure Electric Vehicle), HEV (Hybrid Electric Vehicle), or FCEV (Fuel Cell Electric Vehicle), the requirement in conventional systems to either provide two types of motor generator for the high voltage systems and the low voltage systems, or provide a separate DC—DC converter, is eliminated, allowing a compact and low cost electric vehicle driving system to be obtained, and accordingly, enabling a low cost electric vehicle with greater use of the interior space to be provided.

INDUSTRIAL APPLICABILITY

According to the present invention, the first winding groups and the second winding groups are mechanically and electrically mutually independent, and the second winding groups wound on the second teeth have a different winding specification from the first winding groups, meaning that even if the generated voltage during regeneration is high in the first winding groups, the construction is ideal for maintaining a low voltage in the second winding groups. Specifically, of the generated voltages produced at the rated speed, because it is possible to use the voltage of the first winding groups as the voltage for the high voltage battery for the high voltage systems, and use the voltage of the second winding groups as the voltage for the low voltage battery for the low voltage systems, the requirement to either provide two motor generators for the high voltage battery and the low voltage battery respectively, or to provide a separate DC—DC converter for a single motor generator, is eliminated, allowing a compact and low cost drive system to be realized.

Furthermore, because the first winding groups and the second winding groups wound around the first teeth and the second teeth respectively are mechanically and electrically mutually independent, it is possible to realize a construction in which power running is performed in the first winding groups using the high voltage battery, thereby driving the motor generator, while regeneration is performed by the second winding groups, thereby charging the low voltage battery.

In addition, because the permanent magnet embedded type concentrated winding motor is capable of generating a high level of torque, and the windings on adjacent first teeth within each group comprising a plurality of first teeth have different polarities, irregularities in the magnetic field distribution and distortions of the generated voltage produced between terminals of the first winding groups during driving of the motor is suppressed, enabling a reduction in iron loss, and furthermore heat generation due to eddy currents in the permanent magnets is also minimized, allowing demagnetization of the permanent magnets to be suppressed, all of which enable an extremely efficient motor generator to be provided.

What is claimed is:

1. A motor generator, comprising:
   a rotor having a plurality of permanent magnets;
   a stator having a plurality of teeth; and
   two or more winding groups having a plurality of windings in each group, the windings of the winding groups are wound separately around the plurality of teeth in a mechanically and electrically mutually independent configuration, wherein
   the plurality of teeth are classified into first teeth and second teeth, the winding groups are classified into first winding groups and second winding groups, and a plurality of groups comprising a plurality of the first teeth wound with the windings of the first winding groups are provided in the entire stator; and
   windings of the first winding groups to which voltage of the same phase is applied are wound around the plurality of first teeth within the same group in the manner of that the winding direction is opposite in adjacent first teeth, different phases of voltage are applied to the adjacent plurality of groups, and the second teeth wound with windings of the second winding groups are provided between the groups.

2. The motor generator according to claim 1, wherein the plurality of groups comprise n (where n is an integer $\geq 2$) first teeth each wound with the windings of the first winding group.

3. The motor generator according to claim 1, wherein the relationships:

$p=2\times s\times(\pm 1+3\times k)$ and $p>t$ (k is an integer $\geq 0$)

are satisfied, where the number of poles of the rotor is p, the total number of the first teeth is t, and the number of sets of windings, wherein a set of the first winding groups with the three phases of U, V and W constitutes one set, is s (where p, t and s are all positive integers).

4. The motor generator according to claim 1, wherein for each group composed of the first teeth wound with the windings of the first winding groups, one or more concave sections are provided at the tips of one or more of the first teeth within the group.

5. The motor generator according to claim 1, wherein one or more concave sections are provided at the tips of the second teeth wound with the windings of the second winding groups.

6. The motor generator according to claim 4, wherein the shape of the concave sections is any one of rectangular shape and circular arc shape.

7. The motor generator according to claim 1, wherein the plurality of second teeth wound with the windings of the second winding groups are provided between the groups formed of the plurality of first teeth wound with the windings of the first winding groups.

8. The motor generator according to claim 7, wherein the plurality of second teeth are provided between the groups formed of the plurality of first teeth wound with the windings of the first winding groups, at an interval which matches the pole pitch of the rotor.

9. The motor generator according to claim 7, wherein the plurality of second teeth wound with the windings of the second winding groups are arranged at equal intervals between the groups composed of the plurality of first teeth wound with the windings of the first winding groups.

10. The motor generator according to claim 1, wherein notches which are angled away from the surface of the rotor that opposes the stator, are provided near the circumferential ends of the tips of the plurality of first teeth, opposing the surface of the rotor that opposes the stator.

11. The motor generator according to claim 1, wherein when the number of rotor poles is 10q, the total number of slots formed between the first teeth is 9q, the total number of slots formed between the second teeth is 3q (where q is a positive integer in each case), the angle of a section of the first teeth that opposes the rotor is θ1 rad, and the angle of a section of the second teeth that opposes the rotor is θ2 rad, relationships of $\pi/10q<\theta 1<\pi/5q$ and $\pi/45q<\theta 2<\pi/10q$ are satisfied.

12. The motor generator according to claim 1, wherein 3n groups in the entire stator (where n is a positive integer), each group comprising n first teeth wound with the windings of the first winding groups and 3m second teeth wound with the windings of the second winding groups are provided.

13. The motor generator according to claim 12, wherein 3m groups (where m is a positive integer) in the entire stator, each group comprising m second teeth wound with the windings of the second winding groups are provided.

14. The motor generator according to claim 1, wherein the rotor is configured such that a plurality of permanent magnets are embedded.

15. The motor generator according to claim 1, wherein the rotor is configured such that a plurality of permanent magnets are arranged on the surface of the rotor.

16. The motor generator according to claim 1, wherein the rotor comprises the plurality of permanent magnets, and a rotor core, in which a plurality of slits of substantially the same shape as the permanent magnets and of a width that is narrower than that of the permanent magnets are provided on the opposite side to the stator side of the plurality of permanent magnets.

17. The motor generator according to claim 1, wherein a space between the stator side surfaces of the plurality of permanent magnets provided in the rotor and the surface of the rotor that opposes the stator is shaped so as to be larger in the center than at the ends of each of the plurality of permanent magnets.

18. The motor generator according to claim 17, wherein the plurality of permanent magnets which constitute the rotor are each formed as an approximate V shape protruding away from the surface of the rotor that opposes the stator.

19. The motor generator according to claim 17, wherein the plurality of permanent magnets which constitute the rotor are each formed as a straight line shape that is perpendicular to the radial direction of the rotor.

20. The motor generator according to claim 17, wherein the plurality of permanent magnets which constitute the rotor are each formed as a circular arc shape which protrudes in the direction opposite to the surface of the rotor that opposes the stator.

21. The motor generator according to claim 17, wherein the plurality of permanent magnets which constitute the rotor are each formed as a circular arc shape which has a larger radius than the radius of the rotor and protrudes in the direction to the surface of the rotor that opposes the stator.

22. The motor generator according to claim 1, wherein each of output terminals of the two or more winding groups is separately connected to a power source having a different electric potential and an electric load via an independent power conversion device.

23. The motor generator according to claim 22, comprising the two or more winding groups, and
wherein two or more of the independent power conversion devices comprise an inverter composed of switching elements, a gate drive circuit which drives the switching elements of the inverter, a control section which controls the inverter, a current detection sensor which detects the motor current, a magnetic pole position detection sensor which detects the position of the magnetic poles of the motor, and a power source, and
the two or more power conversion devices share the control section, the magnetic pole position detection sensor, and the power source.

24. The motor generator according to claim 22, comprising the two or more winding groups, and
wherein, with respect to one or more winding groups, a generated voltage produced at an output terminal of the one of the winding groups is set so that a rated voltage is generated at maximum rotations, and the power conversion device connected to the output terminal of each winding is driven in boost mode.

25. The motor generator according to claim 22, comprising the two or more winding groups, and
wherein, with respect to one or more the winding groups, a generated voltage produced at the one of the winding groups is set so that a rated voltage is generated at approximately half of maximum rotations, and the power conversion device connected to the output terminal of each winding is driven by switching between field strengthening and field weakening.

26. The motor generator according to claim 22, comprising the two or more winding groups, and
wherein a generated voltage produced at the output terminal of one or more winding groups is controlled by a control winding wound around a section which forms a magnetic path from the magnets.

27. The motor generator according to claim 22, comprising the two or more winding groups, and
wherein the rotating speed of the motor is controlled by adjusting a voltage applied to one or more winding groups, and a generated voltage produced at the output terminal of the other of the winding groups is controlled in accordance with the controlled rotating speed.

28. A vehicle comprising the motor generator according to claim 1 as an electric motor generator.

29. The motor generator according to claim 2, wherein the relationships:

$$p=2\times s\times(\pm 1+3\times k) \text{ and } p>t \text{ (k is an integer } \geq 0)$$

are satisfied, where the number of poles of the rotor is p, the total number of the first teeth is t, and the number of sets of windings, wherein a set of the first winding groups with the three phases of U, V and W constitutes one set, is s (where p, t and s are all positive integers).

30. The motor generator according to claim 5, wherein the shape of the concave sections is any one of rectangular shape and circular arc shape.

31. A vehicle comprising the motor generator according to claim 22 as an electric motor generator.

* * * * *